United States Patent
Gou et al.

(10) Patent No.: US 9,781,692 B2
(45) Date of Patent: Oct. 3, 2017

(54) BASE STATION AND METHOD FOR PRIMARY AND SECONDARY SYNCHRONIZATION SIGNAL TRANSMISSION IN NEW CARRIERS

(71) Applicant: ZTE CORPORATION, Shenzhen, Guangdong Province (CN)

(72) Inventors: Wei Gou, Shenzhen (CN); Bo Dai, Shenzhen (CN); Xiaogang Han, Shenzhen (CN); Zhisong Zuo, Shenzhen (CN)

(73) Assignee: XI'AN ZHONGXING NEW SOFTWARE CO.LTD., Xi'An, Shaanxi (CN)

( * ) Notice: Subject to any disclaimer, the term of this patent is extended or adjusted under 35 U.S.C. 154(b) by 71 days.

(21) Appl. No.: 14/386,879

(22) PCT Filed: May 6, 2013

(86) PCT No.: PCT/CN2013/075172
§ 371 (c)(1),
(2) Date: Sep. 22, 2014

(87) PCT Pub. No.: WO2013/166941
PCT Pub. Date: Nov. 14, 2013

(65) Prior Publication Data
US 2015/0055632 A1     Feb. 26, 2015

(30) Foreign Application Priority Data

May 11, 2012     (CN) .......................... 2012 1 0146339

(51) Int. Cl.
*H04W 56/00*     (2009.01)
*H04L 5/00*     (2006.01)
(Continued)

(52) U.S. Cl.
CPC ......... *H04W 56/0015* (2013.01); *H04L 5/001* (2013.01); *H04L 5/0051* (2013.01);
(Continued)

(58) Field of Classification Search
CPC .................................................. H04W 56/0015
See application file for complete search history.

(56) References Cited

U.S. PATENT DOCUMENTS 9,119,132 B2 *    8/2015   Luo ..................... H04W 56/001
2011/0235602 A1 *  9/2011   Ji ........................... H04L 5/0007
                                                                370/329
(Continued)

FOREIGN PATENT DOCUMENTS

CN     101370227 A     2/2009
CN     101599937 A     12/2009
(Continued)

Primary Examiner — Jason Mattis
(74) Attorney, Agent, or Firm — Ling Wu; Stephen Yang; Ling and Yang Intellectual Property

(57) ABSTRACT

A method for transmitting primary synchronization signals and secondary synchronization signals in new carriers is provided, which includes: with respect to a time domain, a base station side sending Primary Synchronization Signals (PSS) and Secondary Synchronization Signals (SSS) in Orthogonal Frequency Division Multiplexing (OFDM) symbols except OFDM symbols occupied by reference signals in subframes #1 and #6, or subframes #0 and #5, or subframes #1, #6, #0 and #5; and with respect to a frequency domain, the base station side sending the PSS or SSS in resources of intermediate 6 Physical Resource Block (PRB) pairs of system bandwidth; the reference signals include Demodulation Reference Signals (DMRS).

19 Claims, 3 Drawing Sheets

(51) Int. Cl.
*H04L 27/26* (2006.01)
*H04L 5/14* (2006.01)
*H04B 7/26* (2006.01)

(52) U.S. Cl.
CPC ...... *H04L 27/2601* (2013.01); *H04L 27/2611* (2013.01); *H04W 56/0005* (2013.01); *H04B 7/2656* (2013.01); *H04L 5/0048* (2013.01); *H04L 5/0073* (2013.01); *H04L 5/1469* (2013.01)

(56) References Cited

U.S. PATENT DOCUMENTS

| | | | | |
|---|---|---|---|---|
| 2011/0235743 | A1* | 9/2011 | Lee | H04L 5/0048 375/295 |
| 2011/0268101 | A1* | 11/2011 | Wang | H04L 5/0053 370/344 |
| 2013/0039268 | A1* | 2/2013 | Blankenship | H04W 56/0015 370/328 |
| 2013/0044678 | A1* | 2/2013 | Qu | H04W 52/244 370/328 |
| 2013/0242974 | A1* | 9/2013 | Li | H04W 56/00 370/350 |
| 2013/0265945 | A1* | 10/2013 | He | H04L 27/2657 370/329 |
| 2014/0254504 | A1* | 9/2014 | Bashar | H04L 5/0048 370/329 |

FOREIGN PATENT DOCUMENTS

| | | |
|---|---|---|
| CN | 102055517 A | 5/2011 |
| WO | WO2011103309 A2 | 8/2011 |

\* cited by examiner

BASE STATION AND METHOD FOR PRIMARY AND SECONDARY SYNCHRONIZATION SIGNAL TRANSMISSION IN NEW CARRIERS

TECHNICAL FIELD

The present document relates to the field of mobile wireless communication, and particularly, to a scheme for transmitting Primary Synchronization Signals/Secondary Synchronization Signals (PSS/SSS) in new carriers in the Long Term Evolution (LTE) system.

BACKGROUND OF THE RELATED ART

With the development of the mobile communication industry and the continuously increasing demand of mobile data services, people have increasingly higher requirements on the rate and Quality of Service (QoS) of the mobile communication, thus, before the 3rd Generation mobile communications (3G) is not used in large-scale commerce yet, the research and development work on the next generation mobile communication system has already been started, wherein the LTE project initiated by the 3rd Generation Partnership Project (3GPP) is more typical, and the maximum spectral bandwidth that can be provided by the LTE system is 20 MegaHert (MHz). With the further evolution of the network, the LTE-Advanced (LTE-A) system, as an advanced system of the LTE system, can provide the spectral bandwidth up to 100 MHz and support more flexible communication with higher quality, and meanwhile, the LTE-A system has good backward compatibility. Multiple Component Carriers (CC) exist in the LTE-A system, an LTE terminal can only work in a certain CC with backward compatibility, but an LTE-A terminal with stronger capability can perform transmission in multiple CCs simultaneously. That is, it is implemented that the LTE-A terminal transmitting and receiving data in multiple component carriers simultaneously, thereby achieving the object of promoting the bandwidth. The technology is called the multi-carrier aggregation technology.

The multi-carrier aggregation technology is supported in the LTE-A system, so as to achieve greater bandwidth through the multi-carrier aggregation for transmitting the data. The maximum number of carriers subordinate to the base station is 5, and these carriers are called component carriers, and all of them are carriers with backward compatibility, so as to support the User Equipment (UE) of the earlier LTE version to work. The base station can configure multiple component carriers for one UE and select part or all of the component carriers to be activated for the UE, thus the activated component carriers can provide data transmission for the UE.

In the study of the current stage, based on the multi-carrier aggregation technology, new requirements are raised with respect to aspects such as spectrum resource utilization rate, network energy saving and interference suppression between cells at the LTE R11 stage. In order to achieve this object, a new carrier type is put forward at present, and it is applied with the assistance of the carrier aggregation technology, and the new carrier has a distinct characteristic that it is not required to consider the backward compatibility in design, and more new technologies can be applied in the new carrier. For example, at present, in the LTE R11, with regard to the definition of the new carrier, it is required to be applied matching with at least one compatible carrier, and Cell-specific Reference Signals (CRS) of the LTE R8 are not configured in the new carrier, so as to avoid serious CRS interference at the edge of cell from the adjacent cell, especially the CRS interference between a macrocell and a microcell in a Heterogeneous Network (HetNet) scenario.

In the LTE Rel-8, a rule for sending Primary Synchronization Signals/Secondary Synchronization Signals (PSS/SSS) is that: in Frequency Division Duplexing (FDD), a position for sending the PSS/SSS is: a frequency domain, located at the intermediate 6 Physical Resource Block (PRB) pairs (a PRB is 12 subcarriers) of the system bandwidth, and a schematic diagram of the PRB, PRB pair and slot is given in the reference FIG. 1; and a time domain, located in the last 2 Orthogonal Frequency Division Multiplexing (OFDM) symbols of the first slots of the subframe #0 and subframe #5; in Time Division Duplexing (TDD), a position for sending the PSS/SSS is as shown in FIG. 2, including: a frequency domain, located at the intermediate 6 PRB pairs of the system bandwidth, and a time domain, wherein the PSS are located in the third OFDM symbols of the subframe #1 and subframe #6, and the SSS are located in the last OFDM symbols of the subframe #0 and subframe #5. In the LTE Rel-10, in order to promote the performance of reference signals, Demodulation Reference Signals (DMRS) based on the UE are introduced, and the DMRS are reference signals used for demodulation. In the subframes, the OFDM in which mapping patterns of the DMRS (referring to UE-specific reference signals used for demodulation in the LTE) (the patterns of the UE-specific reference signals related in the examples of the present document are subject to the 36.211v40) are located conflicts with the OFDM bearing the PSS/SSS in the intermediate 6 PRB pairs of the system bandwidth. In the LTE Rel-10, through the provision, the above problem is solved by not configuring to send the DMRS in the PRB pairs in which the DMRS conflict with the PSS/SSS, and since the CRS exist in the LTE Rel-10, the UE still uses the CRS to perform demodulation in these conflicting PRB pairs. In the above analysis, the number of subframes involved in conflict of the TDD is 2 or 4 (it depends on the uplink and downlink subframe configuration in the TDD mode), thus the confronting problem is more severe.

The PRB contains 12 subcarriers in the frequency domain, and it contains 6 correspondingly long Cyclic Prefixs (CP) and/or 7 correspondingly short CPs and OFDM symbols in the time domain, and the PRB pair contains identical subcarriers in the frequency domain, and it contains two continuous PRBs within one subframe in the time domain. One subframe is divided into 2 slots, and the former slot and the later slot are equilong. More detailed information may refer to the provisions of the LTE 36.211 protocol, and definitions of the 36.211 are completely adopted in the technical scheme of the present document.

In the LTE Rel-11, in order to achieve the object of further promoting spectrum efficiency, reducing interference from adjacent cells and implementing energy saving, the above carrier type is put forward, and it is called the new carrier here. At present, it is clear that the CRS are not sent in the new carrier, and reference signals which may be further sent are DMRS, Channel-State Information Reference Signals (CSI-RS) and reference signals used for synchronization tracking, and it is specified that the new carrier uses more efficient DMRS to perform demodulation, and mapping patterns of the CSI-RS within the subframes are subject to the provisions of the 36.211v40 (the patterns of the CSI-RS related in the examples of the present document are subject to the 36.211v40). Therefore, through the analysis, if it continues to perform the mapping of the DMRS in the way of the LTE Rel-10, there will be no reference signals used for demodulation in the intermediate 6 PRB pairs of the system bandwidth in the new carrier, and the problem that data cannot be transmitted exists in these 6 PRB pairs. If a new mapping rule is adopted for the mapping of the DMRS and the resource conflict between the DMRS and the PSS/SSS is avoided, it is also a method for solving the problem, but the design of the reference signals needs a great deal of simulation assessment support, and the amount of standardized works is very large. Moreover, another problem also exists in the new carrier, since it is not configured to send information including system information and paging information and so on in the new carrier, and the PSS/SSS continue to use sequences of the LTE Rel-8 in the new carrier, if the new carrier continues to send the PSS/SSS, a UE previous to the LTE Rel-11 will also detect the PSS/SSS sent in the new carrier, thus it makes the UE previous to the LTE Rel-11 incorrectly access the new carrier, and as the system information and so on are not sent in the new carrier, it makes the UE fail to work.

SUMMARY OF THE DOCUMENT

The example of the present document provides a base station and a method for transmitting PSS/SSS in new carriers, to solve the technical problem that the DMRS mapping conflicts with the PSS/SSS in the carriers.

In order to solve the above technical problem, the example of the present document discloses a method for transmitting primary synchronization signals and secondary synchronization signals in new carriers, which comprises:

with respect to a time domain, a base station side sending Primary Synchronization Signals (PSS) and Secondary Synchronization Signals (SSS) in Orthogonal Frequency Division Multiplexing (OFDM) symbols except OFDM symbols occupied by reference signals in subframes #1 and #6, or subframes #0 and #5, or subframes #1, #6, #0 and #5; and with respect to a frequency domain, the base station side sending the PSS or SSS in resources of intermediate 6 Physical Resource Block (PRB) pairs of system bandwidth;

wherein, the reference signals include Demodulation Reference Signals (DMRS).

In the above method, the step of a base station side sending PSS and SSS in OFDM symbols except OFDM symbols occupied by reference signals in subframes #1 and #6comprises:

the base station side sending the PSS in 2nd OFDM symbols of the subframes #1 and #6, and sending the SSS in 1st OFDM symbols of the subframes #1 and #6; or the base station side sending the SSS in the 2nd OFDM symbols of the subframes #1 and #6, and sending the PSS in the 1st OFDM symbols of the subframes #1 and #6.

In the above method, the step of a base station side sending PSS and SSS in OFDM symbols except OFDM symbols occupied by reference signals in subframes #1, #6, #0 and #5comprises:

the base station side sending the SSS in 9th OFDM symbols of the subframes #0 and #5, and sending the PSS in the 1st OFDM symbols of the subframes #1 and #6; or the base station side sending the PSS in the 9th OFDM symbols of the subframes #0 and #5, and sending the SSS in the 1st OFDM symbols of the subframes #1 and #6; or the base station side sending the SSS in the 9th OFDM symbols of the subframes #0 and #5, and sending the PSS in the 2nd OFDM symbols of the subframes #1 and #6; or the base station side sending the PSS in the 9th OFDM symbols of the subframes #0 and #5, and sending the SSS in the 2nd OFDM symbols of the subframes #1 and #6; or the base station side sending the SSS in 1st or 5th or 8th or 12th OFDM symbols of the subframes #0 and #5, and sending the PSS in the 1st OFDM symbols of the subframes #1 and #6; or the base station side sending the PSS in the 1st or 5th or 8th or 12th OFDM symbols of the subframes #0 and #5, and sending the SSS in the 1st OFDM symbols of the subframes #1and #6; or the base station side sending the SSS in the 1st or 5th or 8th or 12th OFDM symbols of the subframes #0 and #5, and sending the PSS in the 2nd OFDM symbols of the subframes #1and #6; or the base station side sending the PSS in the 1st or 5th or 8th or 12th OFDM symbols of the subframes #0 and #5, and sending the SSS in the 2nd OFDM symbols of the subframes #1and #6.

In the above method, the step of a base station side sending PSS and SSS in OFDM symbols except OFDM symbols occupied by reference signals in subframes #0 and #5comprises:

the base station side sending the PSS in the 1st OFDM symbols of the subframes #0 and #5, and sending the SSS in 2nd or 3rd or 5th or 8th or 9th or 12th OFDM symbols of the subframes #0 and #5; or the base station side sending the SSS in the 1st OFDM symbols of the subframes #0 and #5, and sending the PSS in the 2nd or 3rd or 5th or 8th or 9th or 12th OFDM symbols of the subframes #0 and #5; or the base station side sending the PSS in the 2nd OFDM symbols of the subframes #0 and #5, and sending the SSS in the 3rd or 5th or 8th or 9th or 12th OFDM symbols of the subframes #0 and #5; or the base station side sending the SSS in the 2nd OFDM symbols of the subframes #0 and #5, and sending the PSS in the 3rd or 5th or 8th or 9th or 12th OFDM symbols of the subframes #0 and #5; or the base station side sending the PSS in the 3rd OFDM symbols of the subframes #0 and #5, and sending the SSS in the 5th or 8th or 9th or 12th OFDM symbols of the subframes #0 and #5; or the base station side sending the SSS in the 3rd OFDM symbols of the subframes #0 and #5, and sending the PSS in the 5th or 8th or 9th or 12th OFDM symbols of the subframes #0 and #5; or the base station side sending the PSS in the 5th OFDM symbols of the subframes #0 and #5, and sending the SSS in the 8th or 9th or 12th OFDM symbols of the subframes #0 and #5; or the base station side sending the SSS in the 5th OFDM symbols of the subframes #0 and #5, and sending the PSS in the 8th or 9th or 12th OFDM symbols of the subframes #0 and #5; or the base station side sending the PSS in the 8th OFDM symbols of the subframes #0 and #5, and sending the SSS in the 9th or 12th OFDM symbols of the subframes #0 and #5; or the base station side sending the SSS in the 8th OFDM symbols of the subframes #0 and #5, and sending the PSS in the 9th or 12th OFDM symbols of the subframes #0 and #5; or the base station side sending the PSS in the 9th OFDM symbols of the subframes #0 and #5, and sending the SSS in the 12th OFDM symbols of the subframes #0 and #5; or the base station side sending the SSS in the 9th OFDM symbols of the subframes #0 and #5, and sending the PSS in the 12th OFDM symbols of the subframes #0 and #5.

Wherein, the above method is applicable to a process of sending a normal cyclic prefix.

In the above method, the step of a base station side sending PSS and SSS in OFDM symbols except OFDM symbols occupied by reference signals in subframes #1, #6, #0 and #5comprises:

the base station side sending the PSS in the 3rd OFDM symbols of the subframes #0 and #5, and sending the SSS in the 1st OFDM symbols of the subframes #1 and #6; or the base station side sending the SSS in the 3rd OFDM symbols of the subframes #0 and #5, and sending the PSS in the 1st OFDM symbols of the subframes #1 and #6; or the base station side sending the SSS in the 1st or 4th or 7th or 10th OFDM symbols of the subframes #0 and #5, and sending the PSS in the 1st OFDM symbols of the subframes #1 and #6; or the base station side sending the PSS in the 1st or 4th or 7th or 10th OFDM symbols of the subframes #0 and #5, and sending the SSS in the 1st OFDM symbols of the subframes #1 and #6; or the base station side sending the SSS in the 1st or 4th or 7th or 10th OFDM symbols of the subframes #0 and #5, and sending the PSS in the 2nd OFDM symbols of the subframes #1 and #6; or the base station side sending the PSS in the 1st or 4th or 7th or 10th OFDM symbols of the subframes #0 and #5, and sending the SSS in the 2nd OFDM symbols of the subframes #1 and #6.

In the above method, the step of a base station side sending PSS and SSS in OFDM symbols except OFDM symbols occupied by reference signals in subframes #0 and #5comprises:

the base station side sending the PSS in the 1st OFDM symbols of the subframes #0 and #5, and sending the SSS in the 2nd or 3rd or 4th or 7th or 10th OFDM symbols of the subframes #0 and #5; or the base station side sending the SSS in the 1st OFDM symbols of the subframes #0 and #5, and sending the PSS in the 2nd or 3rd or 4th or 7th or 10th OFDM symbols of the subframes #0 and #5; or the base station side sending the PSS in the 2nd OFDM symbols of the subframes #0 and #5, and sending the SSS in the 3rd or 4th or 7th or 10th OFDM symbols of the subframes #0 and #5; or the base station side sending the SSS in the 2nd OFDM symbols of the subframes #0 and #5, and sending the PSS in the 3rd or 4th or 7th or 10th OFDM symbols of the subframes #0 and #5; or the base station side sending the PSS in the 3rd OFDM symbols of the subframes #0 and #5, and sending the SSS in the 4th or 7th or 10th OFDM symbols of the subframes #0 and #5; or the base station side sending the SSS in the 3rd OFDM symbols of the subframes #0 and #5, and sending the PSS in the 4th or 7th or 10th OFDM symbols of the subframes #0 and #5; or the base station side sending the PSS in the 4th OFDM symbols of the subframes #0 and #5, and sending the SSS in the 7th or 10th OFDM symbols of the subframes #0 and #5; or the base station side sending the SSS in the 4th OFDM symbols of the subframes #0 and #5, and sending the PSS in the 7th or 10th OFDM symbols of the subframes #0 and #5; or the base station side sending the PSS in the 7th OFDM symbols of the subframes #0 and #5, and sending the SSS in the 10th OFDM symbols of the subframes #0 and #5; or the base station side sending the SSS in the 7th OFDM symbols of the subframes #0 and #5, and sending the PSS in the 10th OFDM symbols of the subframes #0 and #5.

In the above method, the step of a base station side sending PSS and SSS in OFDM symbols except OFDM symbols occupied by reference signals in subframes #1 and #6comprises:

the base station side sending the SSS in the 1st OFDM symbols of the subframes #1 and #6, and sending the PSS in 3rd OFDM symbols of the subframes #1 and #6; or the base station side sending the PSS in the 1st OFDM symbols of the subframes #1 and #6, and sending the SSS in the 3rd OFDM symbols of the subframes #1 and #6; or the base station side sending the PSS in the 1st OFDM symbols of the subframes #1 and #6, and sending the SSS in the 2nd OFDM symbols of the subframes #1 and #6; or the base station side sending the SSS in the 1st OFDM symbols of the subframes #1 and #6, and sending the PSS in the 2nd OFDM symbols of the subframes #1 and #6; or the base station side sending the PSS in the 2nd OFDM symbols of the subframes #1 and #6, and sending the SSS in the 3rd OFDM symbols of the subframes #1 and #6; or the base station side sending the SSS in the 2nd OFDM symbols of the subframes #1 and #6, and sending the PSS in the 3rd OFDM symbols of the subframes #1 and #6.

Wherein, the above method is applicable to a process of sending an extended cyclic prefix.

In the above method, the step of a base station side sending PSS and SSS in OFDM symbols except OFDM symbols occupied by reference signals in subframes #1 and #6comprises:

when Cell-specific Reference Signals (CRS) of a port 0 used for synchronization tracking are not sent in the subframes #1 and #6, a base station sending the PSS or SSS through the 1st OFDM symbols of the subframes #1 and #6;

when the CRS of the port 0 used for synchronization tracking are sent in the subframes #1and #6, the base station sending the PSS or SSS through the 1st OFDM symbols of the subframes #1 and #6, and the base station not sending the CRS of the port 0 used for synchronization tracking in the 1st OFDM symbols of the subframes #1 and #6, or not sending the CRS of the port 0 used for synchronization tracking only in conflicting resources in the 1st OFDM symbols of the subframes #1 and #6.

The example of the present document further discloses a method for transmitting primary synchronization signals and secondary synchronization signals in new carriers, which comprises:

with respect to a time domain, a base station side sending Primary Synchronization Signals (PSS) or Secondary Synchronization Signals (SSS) in Orthogonal Frequency Division Multiplexing (OFDM) symbols configured for Channel-State Information Reference Signals (CSI-RS) and/or OFDM symbols configured for sending Cell-specific Reference Signals (CRS) of a port 0 in subframes #0 and #5, and sending the PSS or SSS in one OFDM symbol of each of subframes #1 and #6; and with respect to a frequency domain, the base station side sending the PSS or SSS in resources of intermediate 6 Physical Resource Block (PRB) pairs of system bandwidth.

In the above method, the step of a base station side sending PSS or SSS in OFDM symbols configured for CSI-RS and/or OFDM symbols configured for sending CRS of a port 0 in subframes #0 and #5, and sending the PSS or SSS in one OFDM symbol of each of subframes #1 and #6 comprises:

the base station side sending the SSS in 8th or 9th or 10th or 11th OFDM symbols of the subframes #0 and #5, and sending the PSS in 3rd OFDM symbols of the subframes #1 and #6; or the base station side sending the PSS in the 8th or 9th or 10th or 11th OFDM symbols of the subframes #0 and #5, and sending the SSS in the 3rd OFDM symbols of the subframes #1 and #6; or the base station side sending the SSS in the 8th or 9th or 10th or 11th OFDM symbols of the subframes #0 and #5, and sending the PSS in 2nd OFDM symbols of the subframes #1 and #6; or the base station side sending the PSS in the 8th or 9th or 10th or 11th OFDM symbols of the subframes #0 and #5, and sending the SSS in the 2nd OFDM symbols of the subframes #1 and #6; or the base station side sending the SSS in the 8th or 9th or 10th or 11th OFDM symbols of the subframes #0 and #5, and sending the PSS in 1st OFDM symbols of the subframes #1 and #6; or the base station side sending the PSS in the 8th or 9th or 10th or 11th OFDM symbols of the subframes #0 and #5, and sending the SSS in the 1st OFDM symbols of the subframes #1 and #6.

In the above method, the step of a base station side sending PSS or SSS in OFDM symbols configured for CSI-RS in subframes #0 and #5, and sending the PSS or SSS in one OFDM symbol of each of subframes #1 and #6 comprises:

when a short Cyclic Prefix (CP) is adopted, the base station side sending the PSS in the 9th or 10th or 11th OFDM symbols of the subframes #0 and #5, and sending the SSS in the 2nd OFDM symbols of the subframes #1 and #6; or when the short CP is adopted, the base station side sending the SSS in the 9th or 10th or 11th OFDM symbols of the subframes #0 and #5, and sending the PSS in the 2nd OFDM symbols of the subframes #1 and #6; or when the short CP is adopted, the base station side sending the PSS in the 9th or 10th or 11th OFDM symbols of the subframes #0 and #5, and sending the SSS in the 1st OFDM symbols of the subframes #1 and #6; or when the short CP is adopted, the base station side sending the SSS in the 9th or 10th or 11th OFDM symbols of the subframes #0 and #5, and sending the PSS in the 1st OFDM symbols of the subframes #1 and #6; or when a long CP is adopted, the base station side sending the PSS in the 8th or 9th OFDM symbols of the subframes #0 and #5, and sending the SSS in the 3rd OFDM symbols of the subframes #1 and #6; or when the long CP is adopted, the base station side sending the SSS in the 8th or 9th OFDM symbols of the subframes #0 and #5, and sending the PSS in the 3rd OFDM symbols of the subframes #1 and #6; or when the long CP is adopted, the base station side sending the PSS in the 8th or 9th OFDM symbols of the subframes #0 and #5, and sending the SSS in the 2nd OFDM symbols of the subframes #1 and #6; or when the long CP is adopted, the base station side sending the SSS in the 8th or 9th OFDM symbols of the subframes #0 and #5, and sending the PSS in the 2nd OFDM symbols of the subframes #1 and #6; or when the long CP is adopted, the base station side sending the PSS in the 8th or 9th OFDM symbols of the subframes #0 and #5, and sending the SSS in the 1st OFDM symbols of the subframes #1 and #6; or when the long CP is adopted, the base station side sending the SSS in the 8th or 9th OFDM symbols of the subframes #0 and #5, and sending the PSS in the 1st OFDM symbols of the subframes #1 and #6.

The above method further comprises:

after the step of the base station side sending the PSS or SSS in the OFDM symbols configured for the CSI-RS in the subframes #0 and #5, when the PSS or SSS conflict with the OFDM symbols configured for the CSI-RS, a base station not sending the CSI-RS in the OFDM symbols, or the base station not sending the CSI-RS only in resources with conflict in the OFDM symbols.

In the above method, the step of a base station side sending the PSS or SSS in one OFDM symbol of each of subframes #1 and #6 comprises:

when CRS of a port 0 used for synchronization tracking are not sent in the subframes #1 and #6, the base station sending the PSS or SSS through the 1st OFDM symbols of the subframes #1 and #6; and when the CRS of the port 0 used for synchronization tracking are sent in the subframes #1 and #6, the base station sending the PSS/SSS through the 1st OFDM symbols of the subframes #1 and #6, and the base station not sending the CRS of the port 0 used for synchronization tracking in the OFDM symbols, or not sending the CRS of the port 0 used for synchronization tracking only in conflicting resources in the OFDM symbols.

The example of the present document further discloses a method for transmitting Primary Synchronization Signals/Secondary Synchronization Signals (PSS/SSS) in new carriers, which comprises:

when configuring to send Demodulation Reference Signals (DMRS) and PSS/SSS in resources of intermediate 6 Physical Resource Block (PRB) pairs of system bandwidth, if the DMRS and the PSS/SSS appear within the same Orthogonal Frequency Division Multiplexing (OFDM) symbol, a base station side only sending the PSS/SSS in conflicting OFDM symbols and not sending the DMRS, or the base station side only sending the PSS/SSS in the conflicting OFDM symbols and not sending the DMRS only in resources with conflict in the conflicting OFDM symbols.

The example of the present document further discloses a method for transmitting primary synchronization signals and secondary synchronization signals in new carriers, which comprises:

in resources of intermediate 6 Physical Resource Block (PRB) pairs of system bandwidth, scheduling and sending user equipment data in a unit of slot within a slot in which a PRB without conflict is located, not scheduling and not sending the user equipment data in a slot in which a PRB with conflict is located, and a base station side only sending Primary Synchronization Signals (PSS)/Secondary Synchronization Signals (SSS) in the PRB with conflict, and not sending Demodulation Reference Signals (DMRS);

wherein, the conflict is a conflict between the PSS/SSS and the DMRS occurring in the intermediate 6 PRB pairs.

The example of the present document further discloses a base station, which comprises: a first module and a second module, wherein, the first module is configured to: with respect to a time domain, configure Orthogonal Frequency Division Multiplexing (OFDM) symbols except OFDM symbols occupied by reference signals in subframes #1 and #6, or subframes #0 and #5, or subframes #1, #6, #0 and #5 as OFDM symbols for transmitting Primary Synchronization Signals (PSS) and Secondary Synchronization Signals (SSS), and with respect to a frequency domain, configure resources of intermediate 6 Physical Resource Block (PRB) pairs of system bandwidth as resources for transmitting the PSS or SSS, wherein, the reference signals include Demodulation Reference Signals (DMRS); and the second module is configured to: send the PSS/SSS in the OFDM symbols and the resources configured by the first module.

In the above base station, the second module is configured to: send the PSS in 2nd OFDM symbols of the subframes #1 and #6, and send the SSS in 1st OFDM symbols of the subframes #1 and #6; or send the SSS in the 2nd OFDM symbols of the subframes #1 and #6, and send the PSS in the 1st OFDM symbols of the subframes #1 and #6; or send the SSS in 9th OFDM symbols of the subframes #0 and #5, and send the PSS in the 1st OFDM symbols of the subframes #1 and #6; or send the PSS in the 9th OFDM symbols of the subframes #0 and #5, and send the SSS in the 1st OFDM symbols of the subframes #1 and #6; or send the SSS in the 9th OFDM symbols of the subframes #0 and #5, and send the PSS in the 2nd OFDM symbols of the subframes #1 and #6; or send the PSS in the 9th OFDM symbols of the subframes #0 and #5, and send the SSS in the 2nd OFDM symbols of the subframes #1 and #6; or send the SSS in 1st or 5th or 8th or 12th OFDM symbols of the subframes #0 and #5, and send the PSS in the 1st OFDM symbols of the subframes #1 and #6; or send the PSS in the 1st or 5th or 8th or 12th OFDM symbols of the subframes #0 and #5, and send the SSS in the 1st OFDM symbols of the subframes #1 and #6; or send the SSS in the 1st or 5th or 8th or 12th OFDM symbols of the subframes #0 and #5, and send the PSS in the 2nd OFDM symbols of the subframes #1 and #6; or send the PSS in the 1st or 5th or 8th or 12th OFDM symbols of the subframes #0 and #5, and send the SSS in the 2nd OFDM symbols of the subframes #1 and #6; or send the PSS in the 1st OFDM symbols of the subframes #0 and #5, and send the SSS in 2nd or 3rd or 5th or 8th or 9th or 12th OFDM symbols of the subframes #0 and #5; or send the SSS in the 1st OFDM symbols of the subframes #0 and #5, and send the PSS in the 2nd or 3rd or 5th or 8th or 9th or 12th OFDM symbols of the subframes #0 and #5; or send the PSS in the 2nd OFDM symbols of the subframes #0 and #5, and send the SSS in the 3rd or 5th or 8th or 9th or 12th OFDM symbols of the subframes #0 and #5; or send the SSS in the 2nd OFDM symbols of the subframes #0 and #5, and send the PSS in the 3rd or 5th or 8th or 9th or 12th OFDM symbols of the subframes #0 and #5; or send the PSS in the 3rd OFDM symbols of the subframes #0 and #5, and send the SSS in the 5th or 8th or 9th or 12th OFDM symbols of the subframes #0 and #5; or send the SSS in the 3rd OFDM symbols of the subframes #0 and #5, and send the PSS in the 5th or 8th or 9th or 12th OFDM symbols of the subframes #0 and #5; or send the PSS in the 5th OFDM symbols of the subframes #0 and #5, and send the SSS in the 8th or 9th or 12th OFDM symbols of the subframes #0 and #5; or send the SSS in the 5th OFDM symbols of the subframes #0 and #5, and send the PSS in the 8th or 9th or 12th OFDM symbols of the subframes #0 and #5; or send the PSS in the 8th OFDM symbols of the subframes #0 and #5, and send the SSS in the 9th or 12th OFDM symbols of the subframes #0 and #5; or send the SSS in the 8th OFDM symbols of the subframes #0 and #5, and send the PSS in the 9th or 12th OFDM symbols of the subframes #0 and #5; or send the PSS in the 9th OFDM symbols of the subframes #0 and #5, and send the SSS in the 12th OFDM symbols of the subframes #0 and #5; or send the SSS in the 9th OFDM symbols of the subframes #0 and #5, and send the PSS in the 12th OFDM symbols of the subframes #0 and #5.

In the above base station, the second module is configured to: send the PSS in the 3rd OFDM symbols of the subframes #0 and #5, and send the SSS in the 1st OFDM symbols of the subframes #1 and #6; or send the SSS in the 3rd OFDM symbols of the subframes #0 and #5, and send the PSS in the 1st OFDM symbols of the subframes #1 and #6; or send the SSS in the 1st or 4th or 7th or 10th OFDM symbols of the subframes #0 and #5, and send the PSS in the 1st OFDM symbols of the subframes #1 and #6; or send the PSS in the 1st or 4th or 7th or 10th OFDM symbols of the subframes #0 and #5, and send the SSS in the 1st OFDM symbols of the subframes #1 and #6; or send the SSS in the 1st or 4th or 7th or 10th OFDM symbols of the subframes #0 and #5, and send the PSS in the 2nd OFDM symbols of the subframes #1 and #6; or send the PSS in the 1st or 4th or 7th or 10th OFDM symbols of the subframes #0 and #5, and send the SSS in the 2nd OFDM symbols of the subframes #1 and #6; or send the PSS in the 1st OFDM symbols of the subframes #0 and #5, and send the SSS in the 2nd or 3rd or 4th or 7th or 10th OFDM symbols of the subframes #0 and #5; or send the SSS in the 1st OFDM symbols of the subframes #0 and #5, and send the PSS in the 2nd or 3rd or 4th or 7th or 10th OFDM symbols of the subframes #0 and #5; or send the PSS in the 2nd OFDM symbols of the subframes #0 and #5, and send the SSS in the 3rd or 4th or 7th or 10th OFDM symbols of the subframes #0 and #5; or send the SSS in the 2nd OFDM symbols of the subframes #0 and #5, and send the PSS in the 3rd or 4th or 7th or 10th OFDM symbols of the subframes #0 and #5; or send the PSS in the 3rd OFDM symbols of the subframes #0 and #5, and send the SSS in the 4th or 7th or 10th OFDM symbols of the subframes #0 and #5; or send the SSS in the 3rd OFDM symbols of the subframes #0 and #5, and send the PSS in the 4th or 7th or 10th OFDM symbols of the subframes #0 and #5; or send the PSS in the 4th OFDM symbols of the subframes #0 and #5, and send the SSS in the 7th or 10th OFDM symbols of the subframes #0 and #5; or send the SSS in the 4th OFDM symbols of the subframes #0 and #5, and send the PSS in the 7th or 10th OFDM symbols of the subframes #0 and #5; or send the PSS in the 7th OFDM symbols of the subframes #0 and #5, and send the SSS in the 10th OFDM symbols of the subframes #0 and #5; or send the SSS in the 7th OFDM symbols of the subframes #0 and #5, and send the PSS in the 10th OFDM symbols of the subframes #0 and #5; or send the SSS in the 1st OFDM symbols of the subframes #1 and #6, and send the PSS in 3rd OFDM symbols of the subframes #1 and #6; or send the PSS in the 1st OFDM symbols of the subframes #1 and #6, and send the SSS in the 3rd OFDM symbols of the subframes #1 and #6; or send the PSS in the 1st OFDM symbols of the subframes #1 and #6, and send the SSS in the 2nd OFDM symbols of the subframes #1 and #6; or send the SSS in the 1st OFDM symbols of the subframes #1 and #6, and send the PSS in the 2nd OFDM symbols of the subframes #1 and #6; or send the PSS in the 2nd OFDM symbols of the subframes #1 and #6, and send the SSS in the 3rd OFDM symbols of the subframes #1 and #6; or send the SSS in the 2nd OFDM symbols of the subframes #1 and #6, and send the PSS in the 3rd OFDM symbols of the subframes #1 and #6; or send the SSS in the 8th or 9th or 10th or 11th OFDM symbols of the subframes #0 and #5, and send the PSS in the 3rd OFDM symbols of the subframes #1 and #6; or send the PSS in the 8th or 9th or 10th or 11th OFDM symbols of the subframes #0 and #5, and send the SSS in the 3rd OFDM symbols of the subframes #1 and #6; or send the SSS in the 8th or 9th or 10th or 11th OFDM symbols of the subframes #0 and #5, and send the PSS in the 2nd OFDM symbols of the subframes #1 and #6; or send the PSS in the 8th or 9th or 10th or 11th OFDM symbols of the subframes #0 and #5, and send the SSS in the 2nd OFDM symbols of the subframes #1 and #6; or send the SSS in the 8th or 9th or 10th or 11th OFDM symbols of the subframes #0 and #5, and send the PSS in the 1st OFDM symbols of the subframes #1 and #6; or send the PSS in the 8th or 9th or 10th or 11th OFDM symbols of the subframes #0 and #5, and send the SSS in the 1st OFDM symbols of the subframes #1 and #6.

In the above base station, when a short Cyclic Prefix (CP) is adopted, the second module is configured to: send the PSS in the 9th or 10th or 11th OFDM symbols of the subframes #0 and #5, and send the SSS in the 2nd OFDM symbols of the subframes #1 and #6; or send the SSS in the 9th or 10th or 11th OFDM symbols of the subframes #0 and #5, and send the PSS in the 2nd OFDM symbols of the subframes #1 and #6; or send the PSS in the 9th or 10th or 11th OFDM symbols of the subframes #0 and #5, and send the SSS in the 1st OFDM symbols of the subframes #1 and #6; or send the SSS in the 9th or 10th or 11th OFDM symbols of the subframes #0 and #5, and send the PSS in the 1st OFDM symbols of the subframes #1 and #6;

when a long CP is adopted, the second module is configured to: send the PSS in the 8th or 9th OFDM symbols of the subframes #0 and #5, and send the SSS in the 3rd OFDM symbols of the subframes #1 and #6; or send the SSS in the 8th or 9th OFDM symbols of the subframes #0 and #5, and send the PSS in the 3rd OFDM symbols of the subframes #1 and #6; or send the PSS in the 8th or 9th OFDM symbols of the subframes #0 and #5, and send the SSS in the 2nd OFDM symbols of the subframes #1 and #6; or send the SSS in the 8th or 9th OFDM symbols of the subframes #0 and #5, and send the PSS in the 2nd OFDM symbols of the subframes #1 and #6; or send the PSS in the 8th or 9th OFDM symbols of the subframes #0 and #5, and send the SSS in the 1st OFDM symbols of the subframes #1 and #6; or send the SSS in the 8th or 9th OFDM symbols of the subframes #0 and #5, and send the PSS in the 1st OFDM symbols of the subframes #1 and #6.

In the above base station, the second module is further configured to: when the first module configures to send the DMRS and the PSS/SSS in the resources of the intermediate 6 PRB pairs of the system bandwidth, if the DMRS and the PSS/SSS appear within the same OFDM symbol, only send the PSS/SSS in conflicting OFDM symbols and not send the DMRS, or only send the PSS/SSS in the conflicting OFDM symbols and not send the DMRS only in resources with conflict in the conflicting OFDM symbols.

In the above base station, the second module is further configured to: in the resources of the intermediate 6 PRB pairs of the system bandwidth, schedule and send user equipment data in a unit of slot within a slot in which a PRB without conflict is located, not schedule and not send the user equipment data in a slot in which a PRB with conflict is located, and only send the PSS/SSS in the PRB with conflict, and not send the DMRS;

wherein, the conflict is a conflict between the PSS/SSS and the DMRS occurring in the intermediate 6 PRB pairs.

With the technical scheme of the present document, it enables to use the resources that are originally unavailable due to the conflict between the DMRS mapping and the PSS/SSS in new carriers, and efficient DMRS are adopted to demodulate the data, thereby enhancing the carrier efficiency and avoiding the waste of resources. Moreover, the problem of incorrect access of the UE with low version caused by the PSS/SSS is also solved in the technical scheme of the present document.

PREFERRED EMBODIMENTS OF THE PRESENT DOCUMENT

Figure 1:
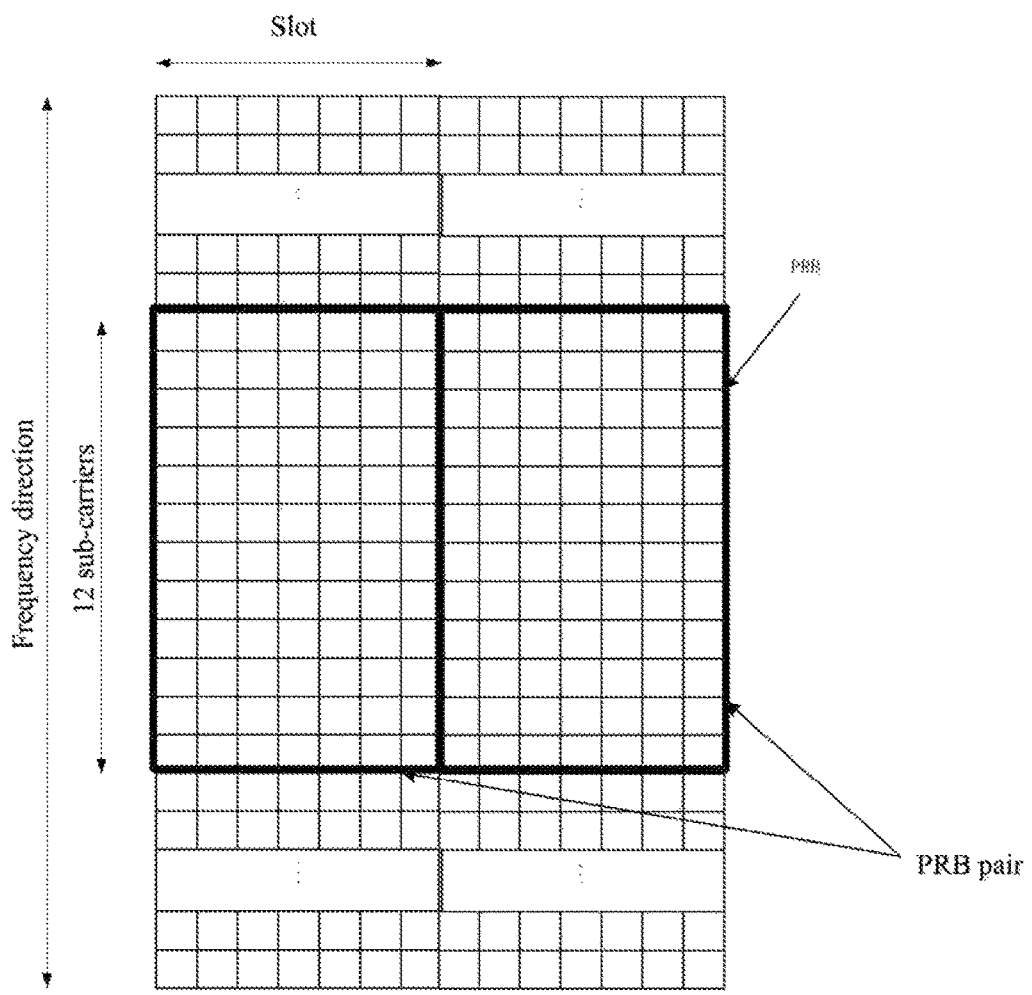
FIG. 1 is a schematic diagram of PRB, PRB pair and slot in the existing LTE.
Figure 2:
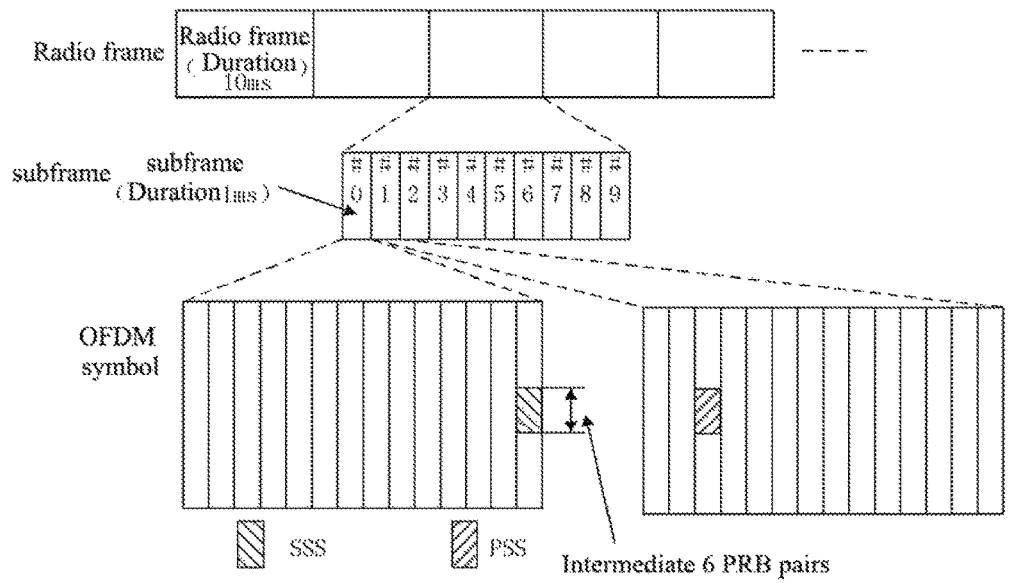
FIG. 2 is a schematic diagram of PSS/SSS configuration in the existing LTE TDD.

In order to make the object, technical scheme and advantages of the present document more clear, the technical scheme of the present document will be described in detail in combination with the accompanying drawings below. It should be noted that the examples in the present document and the characteristics in the examples can be optionally combined with each other in the condition of no conflict.

EXAMPLE 1

The example provides a method for transmitting Primary Synchronization Signals/Secondary Synchronization Signals (PSS/SSS) in new carriers, and an implementation process of the method is described as follows.

with respect to a time domain, a base station side sends the PSS/SSS in OFDM symbols except OFDM symbols occupied by reference signals in subframes #1 and #6, or subframes #0and #5, or subframes #1, #6, #0 and #5; and with respect to a frequency domain, the base station side sends the PSS or SSS in resources of intermediate 6 PRB pairs of the system bandwidth.

Wherein, the reference signals include DMRS. The OFDM symbols occupied by the DMRS mentioned in the present document may refer to provisions in the existing protocol 36.211va40 of the LTE. The DMRS in the example of the present document can be executed according to relevant provisions of the LTE.

Thus the conflict between the PSS/SSS and the reference signals can be avoided, meanwhile, when the UE accesses the carriers, the design of new PSS/SSS positions also enables the UE with new version to identify whether a carrier which the UE is accessing is a backward compatible carrier type or a new carrier type in the first time by detecting the difference of the PSS/SSS positions, thereby enabling the UE with new version to receive system broadcast information in the carrier according to the determined carrier type, helping the UE make a fast access, and shortening the time of receiving the system broadcast information in the access process. After excluding the OFDM symbols occupied by the reference signals, there still exists a great number of OFDM symbols that can be used by the PSS/SSS, therefore, through the simulation, with respect to the PSS/SSS in different positions, the UE detects performance to perform verification, and OFDM symbol positions of the following specific time domains are preferably selected to serve as the OFDM symbol positions for sending the PSS/SSS, and the following sending modes are included.

The base station side sends the PSS in the 2nd OFDM symbols of the subframes #1 and #6, and sends the SSS in the 1st OFDM symbols of the subframes #1 and #6. Or, the base station side sends the SSS in the 2nd OFDM symbols of the subframes #1 and #6, and sends the PSS in the 1st OFDM symbols of the subframes #1 and #6.

The base station side also can send the SSS in the 9th OFDM symbols of the subframes #0and #5, and send the PSS in the 1st OFDM symbols of the subframes #1 and #6; or the base station side sends the PSS in the 9th OFDM symbols of the subframes #0 and #5, and sends the SSS in the 1st OFDM symbols of the subframes #1 and #6.

The base station side sends the SSS in the 9th OFDM symbols of the subframes #0 and #5, and sends the PSS in the 2nd OFDM symbols of the subframes #1 and #6; or the base station side sends the PSS in the 9th OFDM symbols of the subframes #0 and #5, and sends the SSS in the 2nd OFDM symbols of the subframes #1 and #6.

The base station side also can send the SSS in the 1st or 5th or 8th or 12th OFDM symbols of the subframes #0 and #5, and send the PSS in the 1st OFDM symbols of the subframes #1 and #6; or the base station side sends the PSS in the 1st or 5th or 8th or 12th OFDM symbols of the subframes #0 and #5, and sends the SSS in the 1st OFDM symbols of the subframes #1 and #6. Or, the base station side also can send the SSS in the 1st or 5th or 8th or 12th OFDM symbols of the subframes #0 and #5, and send the PSS in the 2nd OFDM symbols of the subframes #1 and #6; or the base station side sends the PSS in the 1st or 5th or 8th or 12th OFDM symbols of the subframes #0 and #5, and sends the SSS in the 2nd OFDM symbols of the subframes #1 and #6.

Moreover, the base station side also can send the PSS in the 1st OFDM symbols of the subframes #0 and #5, and send the SSS in the 2nd or 3rd or 5th or 8th or 9th or 12th OFDM symbols of the subframes #0 and #5; or the base station side sends the SSS in the 1st OFDM symbols of the subframes #0 and #5, and sends the PSS in the 2nd or 3rd or 5th or 8th or 9th or 12th OFDM symbols of the subframes #0 and #5.

For another example, the base station side sends the PSS in the 2nd OFDM symbols of the subframes #0 and #5, and sends the SSS in the 3rd or 5th or 8th or 9th or 12th OFDM symbols of the subframes #0 and #5; or the base station side sends the SSS in the 2nd OFDM symbols of the subframes #0 and #5, and sends the PSS in the 3rd or 5th or 8th or 9th or 12th OFDM symbols of the subframes #0 and #5.

The base station side also can send the PSS in the 3rd OFDM symbols of the subframes #0 and #5, and send the SSS in the 5th or 8th or 9th or 12th OFDM symbols of the subframes #0 and #5; or the base station side sends the SSS in the 3rd OFDM symbols of the subframes #0and #5, and sends the PSS in the 5th or 8th or 9th or 12th OFDM symbols of the subframes #0and #5.

Or, the base station side sends the PSS in the 5th OFDM symbols of the subframes #0 and #5, and sends the SSS in the 8th or 9th or 12th OFDM symbols of the subframes #0 and #5; or the base station side sends the SSS in the 5th OFDM symbols of the subframes #0 and #5, and sends the PSS in the 8th or 9th or 12th OFDM symbols of the subframes #0 and #5.

Or, the base station side sends the PSS in the 8th OFDM symbols of the subframes #0 and #5, and sends the SSS in the 9th or 12th OFDM symbols of the subframes #0 and #5; or the base station side sends the SSS in the 8th OFDM symbols of the subframes #0 and #5, and sends the PSS in the 9th or 12th OFDM symbols of the subframes #0 and #5.

Or, the base station side sends the PSS in the 9th OFDM symbols of the subframes #0 and #5, and sends the SSS in the 12th OFDM symbols of the subframes #0 and #5; or the base station side sends the SSS in the 9th OFDM symbols of the subframes #0 and #5, and sends the PSS in the 12th OFDM symbols of the subframes #0 and #5.

The above determination of the OFDM symbols is preferably used in the condition of short CP (i.e. a Normal Cyclic Prefix), and it also can be used in the condition of long CP (i.e. an Extended Cyclic Prefix), but the performance may slightly degrade.

Furthermore, when the 1st OFDM symbols of the subframes #1 and #6 are used, the above sending modes also need to be performed in the following way: here considering that the reference signals used for synchronization tracking may influence the transmission of the PSS/SSS, the solution is: when the reference signals used for synchronization tracking are not sent in the subframes #0, #1, #5 or #6, the base station sending the PSS/SSS through the OFDM symbols occupied by the reference signals used for synchronization tracking in the subframes #0, #1, #5 or #6. Moreover, the following scheme also can be adopted, and when the base station uses OFDM symbols for sending the reference signals used for synchronization tracking in the subframes #0, #1, #5 or #6, the base station sends the reference signals used for synchronization tracking in the OFDM symbols, or it does not send the reference signals used for synchronization tracking only in the resources with conflict in the OFDM symbols.

The reference signals used for synchronization tracking here include the CRS sent through the port 0, and a period thereof is 5 ms.

The following way is preferably used in the condition of long CP (i.e. the Extended Cyclic Prefix). And it also can be used in the condition of short CP, but the performance may slightly degrade.

The base station side sends the PSS in the 1st OFDM symbols of the subframes #1 and #6, and sends the SSS in the 2nd OFDM symbols of the subframes #1 and #6; or the base station side sends the SSS in the 1st OFDM symbols of the subframes #1 and #6, and sends the PSS in the 2nd OFDM symbols of the subframes #1 and #6.

The base station side also can send the PSS in the 3rd OFDM symbols of the subframes #0 and #5, and send the SSS in the 1st OFDM symbols of the subframes #1 and #6; or the base station side sends the SSS in the 3rd OFDM symbols of the subframes #0 and #5, and sends the PSS in the 1st OFDM symbols of the subframes #1 and #6.

Or, the base station side sends the SSS in the 1st OFDM symbols of the subframes #1 and #6, and sends the PSS in the 3rd OFDM symbols of the subframes #1 and #6; or the base station side sends the PSS in the 1st OFDM symbols of the subframes #1 and #6, and sends the SSS in the 3rd OFDM symbols of the subframes #1 and #6.

Or, the base station side sends the SSS in the 2nd OFDM symbols of the subframes #1and #6, and sends the PSS in the 3rd OFDM symbols of the subframes #1 and #6; or the base station side sends the PSS in the 2nd OFDM symbols of the subframes #1 and #6, and sends the SSS in the 3rd OFDM symbols of the subframes #1 and #6.

Or, the base station side sends the SSS in the 1st or 4th or 7th or 10th OFDM symbols of the subframes #0 and #5, and sends the PSS in the 1st or 2nd OFDM symbols of the subframes #1 and #6; or the base station side sends the PSS in the 1st or 4th or 7th or 10th OFDM symbols of the subframes #0 and #5, and sends the SSS in the 1st or 2nd OFDM symbols of the subframes #1 and #6.

Or, the base station side sends the PSS in the 1st OFDM symbols of the subframes #0 and #5, and sends the SSS in the 2nd or 3rd or 4th or 7th or 10th OFDM symbols of the subframes #0 and #5; or the base station side sends the SSS in the 1st OFDM symbols of the subframes #0and #5, and sends the PSS in the 2nd or 3rd or 4th or 7th or 10th OFDM symbols of the subframes #0 and #5.

Or, the base station side sends the PSS in the 2nd OFDM symbols of the subframes #0and #5, and sends the SSS in the 3rd or 4th or 7th or 10th OFDM symbols of the subframes #0and #5; or the base station side sends the SSS in the 2nd OFDM symbols of the subframes #0and #5, and sends the PSS in the 3rd or 4th or 7th or 10th OFDM symbols of the subframes #0and #5.

Or, the base station side sends the PSS in the 3rd OFDM symbols of the subframes #0 and #5, and sends the SSS in the 4th or 7th or 10th OFDM symbols of the subframes #0 and #5; or the base station side sends the SSS in the 3rd OFDM symbols of the subframes #0 and #5, and sends the PSS in the 4th or 7th or 10th OFDM symbols of the subframes #0 and #5.

Or, the base station side sends the PSS in the 4th OFDM symbols of the subframes #0 and #5, and sends the SSS in the 7th or 10th OFDM symbols of the subframes #0 and #5; or the base station side sends the SSS in the 4th OFDM symbols of the subframes #0 and #5, and sends the PSS in the 7th or 10th OFDM symbols of the subframes #0 and #5.

Or, the base station side sends the PSS in the 7th OFDM symbols of the subframes #0 and #5, and send the SSS in the 10th OFDM symbols of the subframes #0 and #5; or the base station side sends the SSS in the 7th OFDM symbols of the subframes #0 and #5, and send the PSS in the 10th OFDM symbols of the subframes #0 and #5.

Furthermore, when the 1st OFDM symbols of the subframes #1 and #6 are used, the above sending modes also need to be performed in the following way: here considering that the reference signals used for synchronization tracking may influence the transmission of the PSS/SSS, the solution is: when the reference signals used for synchronization tracking are not sent in the subframes #0, #1, #5 or #6, the base station sending the PSS/SSS through the OFDM symbols occupied by the reference signals used for synchronization tracking in the subframes #0, #1, #5 or #6. Moreover, the following scheme also can be adopted, and when the base station uses OFDM symbols for sending the reference signals used for synchronization tracking in the subframes #0, #1, #5 or #6, the base station sends the reference signals used for synchronization tracking in the OFDM symbols, or it does not send the reference signals used for synchronization tracking only in the resources with conflict in the OFDM symbols.

The reference signals used for synchronization tracking here include the CRS sent through the port 0, and a period thereof is 5 ms.

The following condition is also contained in the technical scheme of the present document, and here it mainly aims at the OFDM symbols for sending the CSI-RS.

With respect to the time domain, the base station side sends the PSS or SSS in the OFDM symbols configured for the CSI-RS and/or other OFDM symbols in the subframes #0 and #5, and sends the PSS or SSS in one OFDM symbol of each of subframes #1 and #6; and with respect to the frequency domain, the base station side sends the PSS or SSS in the resources of the intermediate 6 PRB pairs of the system bandwidth.

The base station side sends the SSS in the 8th or 9th or 10th or 11th OFDM symbols of the subframes #0 and #5, and sends the PSS in the 3rd or 2nd or 1st OFDM symbols of the subframes #1 and #6; or the base station side sends the PSS in the 8th or 9th or 10th or 11th OFDM symbols of the subframes #0 and #5, and sends the SSS in the 3rd or 2nd or 1st OFDM symbols of the subframes #1 and #6.

The following sending modes are specifically included.

When the short CP is adopted, the base station side sends the SSS in the 9th or 10th or 11th OFDM symbols of the subframes #0 and #5, and sends the PSS in the 3rd or 2nd or 1st OFDM symbols of the subframes #1 and #6; or when the long CP is adopted, the base station side sends the PSS in the 9th or 10th or 11th OFDM symbols of the subframes #0 and #5, and sends the SSS in the 3rd or 2nd or 1st OFDM symbols of the subframes #1 and #6.

When the long CP is adopted, the base station side sends the PSS in the 8th or 9th OFDM symbols of the subframes #0 and #5, and sends the SSS in the 3rd or 2nd or 1st OFDM symbols of the subframes #1 and #6; or when the short CP is adopted, the base station side sends the SSS in the 8th or 9th OFDM symbols of the subframes #0 and #5, and sends the PSS in the 3rd or 2nd or 1st OFDM symbols of the subframes #1 and #6.

When the base station determines to send the PSS/SSS in the OFDM symbols for sending the CSI-RS, the CSI-RS are not sent in the OFDM symbols, and only the PSS/SSS are sent. When such situation occurs, the UE side assumes that the base station does not send the CSI-RS in the OFDM symbols and only sends the PSS/SSS. Or, when the base station determines to send the PSS/SSS in the OFDM symbols for sending the CSI-RS, the CSI-RS are not sent in resources with conflict in the OFDM symbols, the CSI-RS are sent in resources without conflict, and only the PSS/SSS are sent in the conflicting resources. When such situation occurs, the UE side assumes that the base station does not send the CSI-RS in the resources with conflict in the OFDM symbols, sends the CSI-RS only in the resources without conflict, and sends the PSS/SSS in the conflicting resources.

Furthermore, when the 1st OFDM symbols of the subframes #1 and #6 are used, the above sending modes also need to be performed in the following way: here considering that the reference signals used for synchronization tracking may influence the transmission of the PSS/SSS, the solution is: when the reference signals used for synchronization tracking are not sent in the subframes #0, #1, #5 or #6, the base station sending the PSS/SSS through the OFDM symbols occupied by the reference signals used for synchronization tracking in the subframes #0, #1, #5 or #6. Moreover, the following scheme also can be adopted, and when the base station uses OFDM symbols for sending the reference signals used for synchronization tracking in the subframes #0, #1, #5 or #6, the base station sends the reference signals used for synchronization tracking in the OFDM symbols, or it does not send the reference signals used for synchronization tracking only in the resources with conflict in the OFDM symbols.

The reference signals used for synchronization tracking here include the CRS sent through the port 0, and a period thereof is 5 ms.

The above method for determining the subframes used for sending the PSS/SSS and the OFDM symbols in the subframes is also applicable to determining the subframes used for sending the PSS/SSS and the OFDM symbols in the subframes in the FDD mode in the condition of no conflict. The descriptions of the FDD will not be repeated here.

The above process of transmitting the PSS/SSS will be described in combination with the specific application scenario below.

Figure 3:
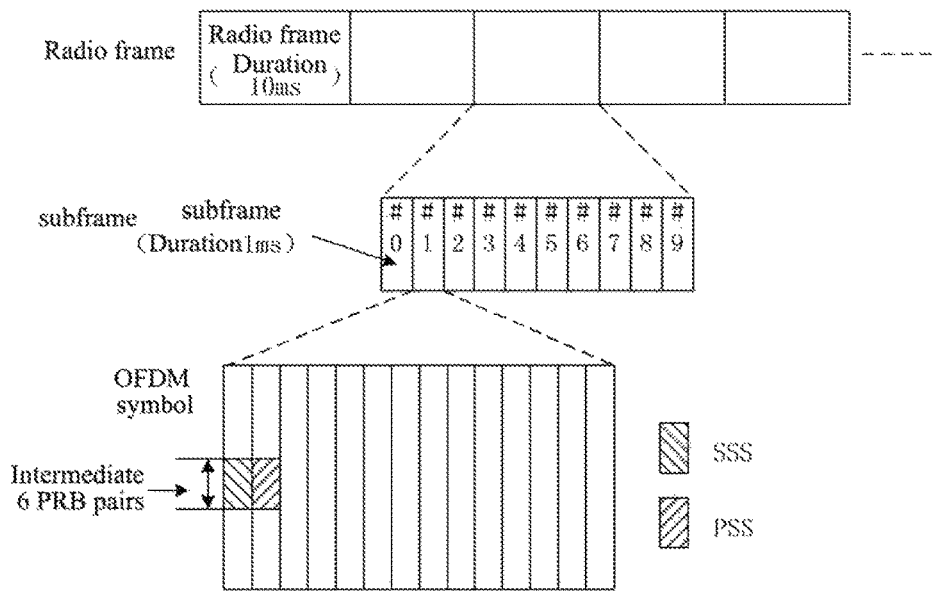
FIG. 3 is a schematic diagram of PSS/SSS configuration provided in the example.

The base station determines an operation mode of the carrier is TDD, and the base station determines that a short CP mode is adopted in the system. At this point, the base station side can send the PSS or SSS in the 2nd OFDM symbols of the subframe #1 and subframe #6, the corresponding frequency domain positions are the corresponding intermediate 6 PRB pairs of the system bandwidth; the base station sends the SSS or PSS in the 1st OFDM symbols of the subframe #1 and subframe #6, the corresponding frequency domain positions are the corresponding intermediate 6 PRB pairs of the system bandwidth, and at the moment, the PSS/SSS configuration is as shown in FIG. 3.

Wherein, a sequence of the PSS/SSS continues to follow the sequence in the LTE R8.

In the example, in the LTE TDD mode, after using the PSS/SSS sending positions given in the technical scheme of the present document, it makes the DMRS and the PSS/SSS not appear within the same OFDM symbol, thus the DMRS can be sent in the intermediate 6 PRB pairs of the system bandwidth in new carriers, and the base station can send data to the UE through the intermediate 6 PRB pairs, and the UE also can receive the data in the intermediate 6 PRB pairs and uses the DMRS to demodulate the data. Meanwhile, the UE with the earlier LTE version cannot correctly detect the PSS/SSS in the new carriers as new sending positions for the PSS/SSS are adopted in the new carriers, thereby avoiding an incorrect access to the new carriers.

Besides the above implementation way, other implementation ways also can be certainly adopted, that is, different positions for the PSS/SSS configuration also can achieve the above benefits.

In the example of the present document, it also puts forward that carrier mode information of the new carriers are configured in the base station, and the carrier mode information is sent to the UE. Specifically, the base station sends the carrier mode information of the new carriers to the UE through the compatible carriers matched with the carrier mode information of the new carriers. The base station can use a Radio Resource Control (RRC) message. For example, the carrier mode information of the new carriers is taken as parameter to be added in RNReconfigurationComplete and then sent to the UE by the base station.

For example, when the base station determines to schedule and use the new carriers for the UE, the base station notifies the UE of the carrier mode information of the new carriers through the RNReconfigurationComplete added with the carrier mode information of the new carriers. Then the UE can execute the corresponding reception action according to the carrier mode information of the new carriers. Or the base station sends the carrier mode information of the new carriers to the UE through system broadcast information of the compatible carriers matched with the carrier mode information of the new carriers, thus, after the UE accesses the compatible carriers, the UE can obtain the carrier mode information of the new carriers matched with the compatible carriers.

EXAMPLE 2

The example provides a method for transmitting Primary Synchronization Signals/Secondary Synchronization Signals (PSS/SSS) in new carriers, which includes:

with respect to the time domain, the base station side sends the PSS or SSS in the OFDM symbols configured for the Channel-State Information Reference Signals (CSI-RS) and/or other OFDM symbols in the subframes #0 and #5, and sends the PSS or SSS in one OFDM symbol of each of subframes #1 and #6; and with respect to the frequency domain, the base station side sends the PSS or SSS in the resources of the intermediate 6 PRB pairs of the system bandwidth.

Specifically, when the base station side sends the PSS or SSS in the OFDM symbols configured for the CSI-RS and/or the OFDM symbols configured for sending the Cell-specific Reference Signals (CRS) of the port 0 in the subframes #0 and #5, and sends the PSS or SSS in one OFDM symbol of each of the subframes #1 and #6:

the base station side can send the SSS in the 8th or 9th or 10th or 11th OFDM symbols of the subframes #0 and #5, and send the PSS in the 3rd or 2nd or 1st OFDM symbols of the subframes #1 and #6.

Or, the base station side sends the PSS in the 8th or 9th or 10th or 11th OFDM symbols of the subframes #0 and #5, and sends the SSS in the 3rd or 2nd or 1st OFDM symbols of the subframes #1 and #6.

Or, the base station side sends the SSS in the 8th or 9th or 10th or 11th OFDM symbols of the subframes #0 and #5, and sends the PSS in the 2nd OFDM symbols of the subframes #1 and #6.

Or, the base station side sends the PSS in the 8th or 9th or 10th or 11th OFDM symbols of the subframes #0 and #5, and sends the SSS in the 2nd OFDM symbols of the subframes #1 and #6.

Or, the base station side sends the SSS in the 8th or 9th or 10th or 11th OFDM symbols of the subframes #0 and #5, and sends the PSS in the 1st OFDM symbols of the subframes #1 and #6.

Or, the base station side sends the PSS in the 8th or 9th or 10th or 11th OFDM symbols of the subframes #0 and #5, and sends the SSS in the 1st OFDM symbols of the subframes #1 and #6.

When the base station side sends the PSS or SSS in the OFDM symbols configured for the CSI-RS in the subframes #0 and #5, and sends the PSS or SSS in one OFDM symbol of each of the subframes #1 and #6:

if the short CP is adopted, the base station side can send the PSS in the 9th or 10th or 11th OFDM symbols of the subframes #0 and #5, and send the SSS in the 2nd or 1st OFDM symbols of the subframes #1 and #6.

Or, the base station side sends the SSS in the 9th or 10th or 11th OFDM symbols of the subframes #0 and #5, and sends the PSS in the 2nd or 1st OFDM symbols of the subframes #1 and #6.

Or, the base station side sends the PSS in the 9th or 10th or 11th OFDM symbols of the subframes #0 and #5, and sends the SSS in the 1st OFDM symbols of the subframes #1 and #6.

Or, the base station side sends the SSS in the 9th or 10th or 11th OFDM symbols of the subframes #0 and #5, and sends the PSS in the 1st OFDM symbols of the subframes #1 and #6.

When the base station side sends the PSS or SSS in the OFDM symbols configured for the CSI-RS in the subframes #0 and #5, and sends the PSS or SSS in one OFDM symbol of each of the subframes #1 and #6:

when the long CP is adopted, the base station side can send the PSS in the 8th or 9th OFDM symbols of the subframes #0 and #5, and send the SSS in the 3rd or 2nd or 1st OFDM symbols of the subframes #1 and #6.

Or, the base station side sends the SSS in the 8th or 9th OFDM symbols of the subframes #0 and #5, and sends the PSS in the 3rd or 2nd or 1st OFDM symbols of the subframes #1 and #6.

Or, the base station side sends the PSS in the 8th or 9th OFDM symbols of the subframes #0 and #5, and sends the SSS in the 2nd OFDM symbols of the subframes #1 and #6.

Or, the base station side sends the SSS in the 8th or 9th OFDM symbols of the subframes #0 and #5, and sends the PSS in the 2nd OFDM symbols of the subframes #1 and #6.

Or, the base station side sends the PSS in the 8th or 9th OFDM symbols of the subframes #0 and #5, and sends the SSS in the 1st OFDM symbols of the subframes #1 and #6.

Or, the base station side sends the SSS in the 8th or 9th OFDM symbols of the subframes #0 and #5, and sends the PSS in the 1st OFDM symbols of the subframes #1 and #6.

Moreover, in the above scheme, when the PSS or SSS conflict with the OFDM symbols configured for the CSI-RS, the base station does not send the CSI-RS in the OFDM symbols, or the base station does not send the CSI-RS only in the resources with conflict in the OFDM symbols. When the CRS of the port 0 used for synchronization tracking are not sent in the subframes #1 and #6, the base station sends the PSS or SSS through the 1st OFDM symbols of the subframes #1 and #6. When the CRS of the port 0 used for synchronization tracking are sent in the subframes #1 and #6, the base station can send the PSS/SSS through the 1st OFDM symbols of the subframes #1 and #6, and the base station does not send the CRS of the port 0 used for synchronization tracking in the OFDM symbols, or it does not send the CRS of the port 0 used for synchronization tracking only in the resources with conflict in the OFDM symbols.

EXAMPLE 3

The example also provides a method for transmitting PSS/SSS, in this method, while the PSS/SSS positions are not changed, a scheduling way of the resources of the intermediate 6 PRB pairs of the system bandwidth also can be used. Specifically, the method includes:

when the base station side configures to send the DMRS and the PSS/SSS in the intermediate 6 PRB pairs, if the DMRS and the PSS/SSS appear within the same OFDM symbol, the base station side not sending the DMRS in the conflicting OFDM symbols, and only sending the PSS/SSS.

Thus the DMRS are actually eliminated without being sent during the occurrence of conflict.

It can be seen from the example that the transmission density of original DMRS is reduced in this scheme, that is, once the base station side and the UE side make an agreement in advance, when receiving the DMRS in the intermediate 6 PRB pairs of the system bandwidth, the UE takes the eliminated DMRS in the DMRS as the data to be processed.

Figure 4:
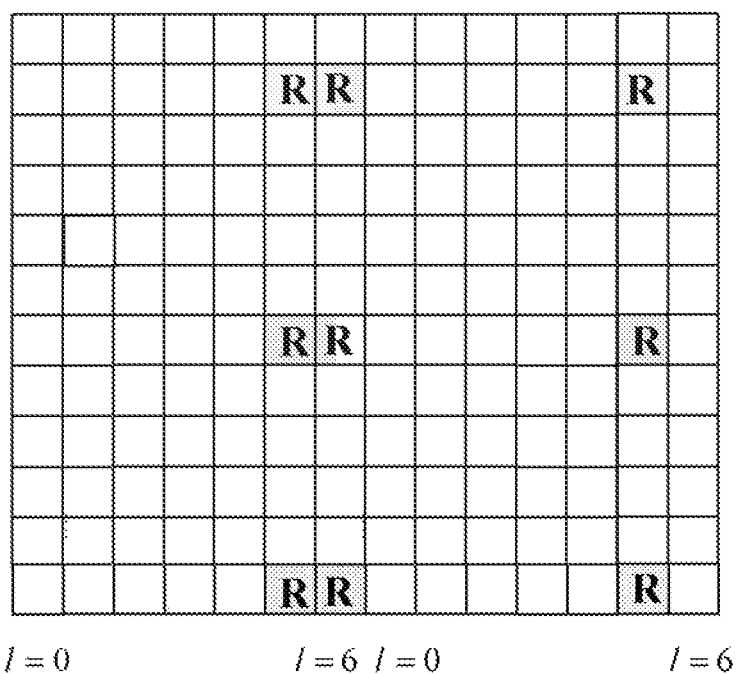
FIG. 4 is a schematic diagram of DMRS in OFDM without conflict provided in the example.

For example, the TDD mode is taken as an example, according to the above method for eliminating the DMRS, the DMRS in the last OFDM symbol should not be sent in the subframe #0, but the SSS is sent, and the operations of other subframes are similar. Thus, for the subframe #0, a DMRS pattern of the port 9 within the subframes of the intermediate 6 PRB pairs of the system bandwidth is as shown in FIG. 4. The detailed DMRS pattern may refer to the LTE 36.211 protocol.

In this scheme, the PSS/SSS are transmitted through the resources of the intermediate 6 PRB pairs of the system bandwidth, which has the advantage of simple implementation.

EXAMPLE 4

The example also provides a method for transmitting PSS/SSS, in this method, while the PSS/SSS positions are not changed, a scheduling way of the resources of the intermediate 6 PRB pairs also can be used. Specifically, the method includes:

the base station side scheduling and sending UE data in a unit of slot within a slot in which a PRB without conflict is located in the intermediate 6 PRB pairs of the system bandwidth, not scheduling and not sending the UE data in a slot in which a PRB with conflict is located, and the base station sending the PSS/SSS and not sending the DMRS in the PRB with conflict.

For example, the TDD mode is taken as an example, according to the scheduling method of the example, in the subframe #0, since the DMRS have conflict in the second slot, it does not schedule and not send data in the second slot, but the PSS/SSS are sent in the conflicting OFDM, and the DMRS are not sent. In the first slot, no conflict occurs between the DMRS and the PSS/SSS sent by the base station, thus the base station schedules and sends data in the first slot.

This scheme of the example changes the original scheduling way based on the PRB pair and adopts the scheduling based on the PRB, since the PRB is equilong to the slot in the time direction, it also can be said that the scheduling is performed based on the slot. In this scheme, the characteristic of the DMRS transmission is utilized, which schedules and sends the UE data only within the slot in which the DMRS are sent, and uses part of resources of the intermediate 6 PRB pairs of the system bandwidth.

EXAMPLE 5

The example introduces a base station, and the base station can implement all the schemes for transmitting the Primary Synchronization Signals/Secondary Synchronization Signals (PSS/SSS) in the new carriers provided in the above examples 1, 2, 3 and 4. The base station at least includes a first module and a second module.

The first module is configured to: with respect to a time domain, configure OFDM symbols except OFDM symbols occupied by reference signals in subframes #1 and #6, or subframes #0 and #5, or subframes #1, #6, #0 and #5 as OFDM symbols for transmitting PSS and SSS, and with respect to a frequency domain, configure resources of intermediate 6 PRB pairs of system bandwidth as resources for transmitting the PSS or SSS, wherein, the reference signals mentioned in the example include DMRS; and the second module is configured to: send the PSS/SSS in the OFDM symbols and the resources configured by the first module.

Specifically, when the first module configures the OFDM symbols except the OFDM symbols occupied by the reference signals in the subframes #1 and #6 as the OFDM symbols for transmitting the PSS and SSS, the second module is configured to: according to the OFDM symbols configured by the first module, send the PSS in the 2nd OFDM symbols of the subframes #1 and #6, and send the SSS in theist OFDM symbols of the subframes #1 and #6.

The SSS also can be sent in the 2nd OFDM symbols of the subframes #1 and #6, and the PSS can be sent in theist OFDM symbols of the subframes #1 and #6.

Or, when the first module configures the OFDM symbols except the OFDM symbols occupied by the reference signals in the subframes #1, #6, #0 and #5 as the OFDM symbols for transmitting the PSS and SSS, the second module is configured to: send the SSS in the 9th OFDM symbols of the subframes #0 and #5, and send the PSS in the 1st OFDM symbols of the subframes #1 and #6;

or, send the PSS in the 9th OFDM symbols of the subframes #0 and #5, and send the SSS in the 1st OFDM symbols of the subframes #1 and #6;

or, send the SSS in the 9th OFDM symbols of the subframes #0 and #5, and send the PSS in the 2nd OFDM symbols of the subframes #1 and #6;

or, send the PSS in the 9th OFDM symbols of the subframes #0 and #5, and send the SSS in the 2nd OFDM symbols of the subframes #1 and #6;

or, send the SSS in the 1st or 5th or 8th or 12th OFDM symbols of the subframes #0 and #5, and send the PSS in the 1st OFDM symbols of the subframes #1 and #6;

or, send the PSS in the 1st or 5th or 8th or 12th OFDM symbols of the subframes #0 and #5, and send the SSS in the 1st OFDM symbols of the subframes #1 and #6;

or, send the SSS in the 1st or 5th or 8th or 12th OFDM symbols of the subframes #0 and #5, and send the PSS in the 2nd OFDM symbols of the subframes #1 and #6;

or, send the PSS in the 1st or 5th or 8th or 12th OFDM symbols of the subframes #0 and #5, and send the SSS in the 2nd OFDM symbols of the subframes #1 and #6.

Moreover, when the first module configures the OFDM symbols except the OFDM symbols occupied by the reference signals in the subframes #0 and #5 as the OFDM symbols for transmitting the PSS and SSS, the second module can be configured to: send the PSS in the 1st OFDM symbols of the subframes #0 and #5, and send the SSS in the 2nd or 3rd or 5th or 8th or 9th or 12th OFDM symbols of the subframes #0 and #5;

or, send the SSS in the 1st OFDM symbols of the subframes #0 and #5, and send the PSS in the 2nd or 3rd or 5th or 8th or 9th or 12th OFDM symbols of the subframes #0 and #5;

or, send the PSS in the 2nd OFDM symbols of the subframes #0 and #5, and send the SSS in the 3rd or 5th or 8th or 9th or 12th OFDM symbols of the subframes #0 and #5;

or, send the SSS in the 2nd OFDM symbols of the subframes #0 and #5, and send the PSS in the 3rd or 5th or 8th or 9th or 12th OFDM symbols of the subframes #0 and #5;

or, send the PSS in the 3rd OFDM symbols of the subframes #0 and #5, and send the SSS in the 5th or 8th or 9th or 12th OFDM symbols of the subframes #0 and #5;

or, send the SSS in the 3rd OFDM symbols of the subframes #0 and #5, and send the PSS in the 5th or 8th or 9th or 12th OFDM symbols of the subframes #0 and #5;

or, send the PSS in the 5th OFDM symbols of the subframes #0 and #5, and send the SSS in the 8th or 9th or 12th OFDM symbols of the subframes #0 and #5;

or, send the SSS in the 5th OFDM symbols of the subframes #0 and #5, and send the PSS in the 8th or 9th or 12th OFDM symbols of the subframes #0 and #5;

or, send the PSS in the 8th OFDM symbols of the subframes #0 and #5, and send the SSS in the 9th or 12th OFDM symbols of the subframes #0 and #5;

or, send the SSS in the 8th OFDM symbols of the subframes #0 and #5, and send the PSS in the 9th or 12th OFDM symbols of the subframes #0 and #5;

or, send the PSS in the 9th OFDM symbols of the subframes #0 and #5, and send the SSS in the 12th OFDM symbols of the subframes #0 and #5;

or, send the SSS in the 9th OFDM symbols of the subframes #0 and #5, and send the PSS in the 12th OFDM symbols of the subframes #0 and #5.

It should be noted that, the operations of the above first module and second module are applicable to the sending processes of all CPs, and particularly, to the sending process of the short CP.

Other schemes are put forward with respect to the sending process of the long CP, that is, if these schemes are used for the sending process of the long CP, the effect is better. At this point, the second module is configured to: send the PSS in the 3rd OFDM symbols of the subframes #0 and #5, and send the SSS in the 1st OFDM symbols of the subframes #1 and #6;

or, send the SSS in the 3rd OFDM symbols of the subframes #0 and #5, and send the PSS in the 1st OFDM symbols of the subframes #1 and #6;

or, send the SSS in the 1st or 4th or 7th or 10th OFDM symbols of the subframes #0 and #5, and send the PSS in the 1st OFDM symbols of the subframes #1 and #6;

or, send the PSS in the 1st or 4th or 7th or 10th OFDM symbols of the subframes #0 and #5, and send the SSS in the 1st OFDM symbols of the subframes #1 and #6;

or, send the SSS in the 1st or 4th or 7th or 10th OFDM symbols of the subframes #0 and #5, and send the PSS in the 2nd OFDM symbols of the subframes #1 and #6;

or, send the PSS in the 1st or 4th or 7th or 10th OFDM symbols of the subframes #0 and #5, and send the SSS in the 2nd OFDM symbols of the subframes #1 and #6;

or, send the PSS in the 1st OFDM symbols of the subframes #0 and #5, and send the SSS in the 2nd or 3rd or 4th or 7th or 10th OFDM symbols of the subframes #0 and #5;

or, send the SSS in the 1st OFDM symbols of the subframes #0 and #5, and send the PSS in the 2nd or 3rd or 4th or 7th or 10th OFDM symbols of the subframes #0 and #5;

or, send the PSS in the 2nd OFDM symbols of the subframes #0 and #5, and send the SSS in the 3rd or 4th or 7th or 10th OFDM symbols of the subframes #0 and #5;

or, send the SSS in the 2nd OFDM symbols of the subframes #0 and #5, and send the PSS in the 3rd or 4th or 7th or 10th OFDM symbols of the subframes #0 and #5;

or, send the PSS in the 3rd OFDM symbols of the subframes #0 and #5, and send the SSS in the 4th or 7th or 10th OFDM symbols of the subframes #0 and #5;

or, send the SSS in the 3rd OFDM symbols of the subframes #0 and #5, and send the PSS in the 4th or 7th or 10th OFDM symbols of the subframes #0 and #5;

or, send the PSS in the 4th OFDM symbols of the subframes #0 and #5, and send the SSS in the 7th or 10th OFDM symbols of the subframes #0 and #5;

or, send the SSS in the 4th OFDM symbols of the subframes #0 and #5, and send the PSS in the 7th or 10th OFDM symbols of the subframes #0 and #5;

or, send the PSS in the 7th OFDM symbols of the subframes #0 and #5, and send the SSS in the 10th OFDM symbols of the subframes #0 and #5;

or, send the SSS in the 7th OFDM symbols of the subframes #0 and #5, and send the PSS in the 10th OFDM symbols of the subframes #0 and #5;

or, send the SSS in the 1st OFDM symbols of the subframes #1 and #6, and send the PSS in 3rd OFDM symbols of the subframes #1 and #6;

or, send the PSS in the 1st OFDM symbols of the subframes #1 and #6, and send the SSS in the 3rd OFDM symbols of the subframes #1 and #6;

or, send the PSS in the 1st OFDM symbols of the subframes #1 and #6, and send the SSS in the 2nd OFDM symbols of the subframes #1 and #6;

or, send the SSS in the 1st OFDM symbols of the subframes #1 and #6, and send the PSS in the 2nd OFDM symbols of the subframes #1 and #6;

or, send the PSS in the 2nd OFDM symbols of the subframes #1 and #6, and send the SSS in the 3rd OFDM symbols of the subframes #1 and #6;

or, send the SSS in the 2nd OFDM symbols of the subframes #1 and #6, and send the PSS in the 3rd OFDM symbols of the subframes #1 and #6;

or, send the SSS in the 8th or 9th or 10th or 11th OFDM symbols of the subframes #0 and #5, and send the PSS in the 3rd OFDM symbols of the subframes #1 and #6;

or, send the PSS in the 8th or 9th or 10th or 11th OFDM symbols of the subframes #0 and #5, and send the SSS in the 3rd OFDM symbols of the subframes #1 and #6;

or, send the SSS in the 8th or 9th or 10th or 11th OFDM symbols of the subframes #0 and #5, and send the PSS in the 2nd OFDM symbols of the subframes #1 and #6;

or, send the PSS in the 8th or 9th or 10th or 11th OFDM symbols of the subframes #0 and #5, and send the SSS in the 2nd OFDM symbols of the subframes #1 and #6;

or, send the SSS in the 8th or 9th or 10th or 11th OFDM symbols of the subframes #0 and #5, and send the PSS in the 1st OFDM symbols of the subframes #1 and #6;

or, send the PSS in the 8th or 9th or 10th or 11th OFDM symbols of the subframes #0 and #5, and send the SSS in the 1st OFDM symbols of the subframes #1 and #6.

Moreover, when the short CP is adopted, the second module can further be configured to: send the PSS in the 9th or 10th or 11th OFDM symbols of the subframes #0 and #5, and send the SSS in the 2nd OFDM symbols of the subframes #1 and #6;

or, send the SSS in the 9th or 10th or 11th OFDM symbols of the subframes #0 and #5, and send the PSS in the 2nd OFDM symbols of the subframes #1 and #6;

or, send the PSS in the 9th or 10th or 11th OFDM symbols of the subframes #0 and #5, and send the SSS in the 1st OFDM symbols of the subframes #1 and #6;

or, send the SSS in the 9th or 10th or 11th OFDM symbols of the subframes #0 and #5, and send the PSS in the 1st OFDM symbols of the subframes #1 and #6.

And when the long CP is adopted, the second module can be configured to: send the PSS in the 8th or 9th OFDM symbols of the subframes #0 and #5, and send the SSS in the 3rd OFDM symbols of the subframes #1 and #6;

or, send the SSS in the 8th or 9th OFDM symbols of the subframes #0 and #5, and send the PSS in the 3rd OFDM symbols of the subframes #1 and #6;

or, send the PSS in the 8th or 9th OFDM symbols of the subframes #0 and #5, and send the SSS in the 2nd OFDM symbols of the subframes #1 and #6;

or, send the SSS in the 8th or 9th OFDM symbols of the subframes #0 and #5, and send the PSS in the 2nd OFDM symbols of the subframes #1 and #6;

or, send the PSS in the 8th or 9th OFDM symbols of the subframes #0 and #5, and send the SSS in the 1st OFDM symbols of the subframes #1 and #6;

or, send the SSS in the 8th or 9th OFDM symbols of the subframes #0 and #5, and send the PSS in the 1st OFDM symbols of the subframes #1 and #6.

Besides all the above schemes for transmitting the PSS/SSS, the first module of the base station can further be configured to: when configuring to send the DMRS and the PSS/SSS in the resources of the intermediate 6 PRB pairs of the system bandwidth, judge whether the DMRS and the PSS/SSS appear within the same OFDM symbol; and the second module can further be configured to: when the DMRS and the PSS/SSS appear within the same OFDM symbol, only send the PSS/SSS in the conflicting OFDM symbols and not send the DMRS; or the second module can further be configured to: only send the PSS/SSS in the conflicting OFDM symbols and not send the DMRS only in resources with conflict in the conflicting OFDM symbols. The specific implementation of the scheme may refer to the above example 3, which is not repeated here.

Or, the second module can further be configured to: in the resources of the intermediate 6 PRB pairs of the system bandwidth, schedule and send the user equipment data in a unit of slot within a slot in which a PRB without conflict is located, not schedule and not send the user equipment data in a slot in which a PRB with conflict is located, and only send the PSS/SSS in the PRB with conflict, and not send the DMRS. Wherein, the conflict is a conflict between the PSS/SSS and the DMRS occurring in the intermediate 6 PRB pairs. The specific implementation of the scheme may refer to the above example 4, which is not repeated here.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The example of the present document is not limited to any combination of hardware and software in a specific form.

The above description is only the preferred examples of the present document, which is not used to limit the protection scope of the present document. All the modifications, equivalent substitutions, improvements and so on made within the spirit and principle of the present document shall fall into the protection scope of the present document.

INDUSTRIAL APPLICABILITY

With the technical scheme of the present document, it enables to use the resources that are originally unavailable due to the conflict between the DMRS mapping and the PSS/SSS in new carriers, and efficient DMRS are adopted to demodulate the data, thereby enhancing the carrier efficiency and avoiding the waste of resources. Moreover, the problem of incorrect access of the UE with low version caused by the PSS/SSS is also solved in the technical scheme of the present document.

What is claimed is:

1. A method for transmitting primary synchronization signals and secondary synchronization signals in new carriers, comprising:
with respect to a time domain, a base station side sending Primary Synchronization Signals (PSS) and Secondary Synchronization Signals (SSS) in Orthogonal Frequency Division Multiplexing (OFDM) symbols which are not occupied by Demodulation Reference Signals (DMRS) in subframes #1 and #6, or subframes #0 and #5, or subframes #1, #6, #0 and #5 and still sending the DMRS in OFDM symbols which are occupied by the DMRS in the same subframes #1 and #6, or subframes #0 and #5, or subframes #1, #6, #0 and #5; and with respect to a frequency domain, the base station side sending the PSS or SSS in resources of intermediate 6 Physical Resource Block (PRB) pairs of system bandwidth;
wherein the method further comprises:
the base station side sending the PSS/SSS in OFDM symbols configured for reference signals used for synchronization tracking including Cell-specific Reference Signals (CRS) through a port 0 with a period thereof being 5 ms:
when the reference signals used for synchronization tracking are not sent in subframes #1 and #6, or subframes #0 and #5, or subframes #1, #6, #0 and #5, the base station sending the PSS/SSS through the OFDM symbols occupied by the reference signals used for synchronization tracking;
when the reference signals used for synchronization tracking are sent in subframes #1 and #6, or subframes #0 and #5, or subframes #1, #6, #0 and #5, the base station not sending the reference signals used for synchronization tracking only in conflicting resources in the OFDM symbols occupied by the reference signals used for synchronization tracking; wherein the conflicting resources refers to overlapping resources between the PSS/SSS and the reference signals used for synchronization tracking.

2. The method according to claim 1, wherein, the step of a base station side sending PSS and SSS in OFDM symbols which are not occupied by DMRS in subframes #1 and #6 comprises:
the base station side sending the PSS in 2nd OFDM symbols of the subframes #1 and #6, and sending the SSS in 1st OFDM symbols of the subframes #1 and #6; or
the base station side sending the SSS in 2nd OFDM symbols of the subframes #1 and #6, and sending the PSS in 1st OFDM symbols of the subframes #1 and #6.

3. The method according to claim 1, wherein, the step of a base station side sending PSS and SSS in OFDM symbols which are not occupied by DMRS in subframes #1 and #6 comprises:
the base station side sending the SSS in 9th OFDM symbols of the subframes #0 and #5, and sending the PSS in 1st OFDM symbols of the subframes #1 and #6; or
the base station side sending the PSS in 9th OFDM symbols of the subframes #0 and #5, and sending the SSS in 1st OFDM symbols of the subframes #1 and #6; or
the base station side sending the SSS in 9th OFDM symbols of the subframes #0 and #5, and sending the PSS in 2nd OFDM symbols of the subframes #1 and #6; or
the base station side sending the PSS in 9th OFDM symbols of the subframes #0 and #5, and sending the SSS in 2nd OFDM symbols of the subframes #1 and #6; or
the base station side sending the SSS in 1st or 5th or 8th or 12th OFDM symbols of the subframes #0 and #5, and sending the PSS in 1st OFDM symbols of the subframes #1 and #6; or
the base station side sending the PSS in 1st or 5th or 8th or 12th OFDM symbols of the subframes #0 and #5, and sending the SSS in 1st OFDM symbols of the subframes #1 and #6; or
the base station side sending the SSS in 1st or 5th or 8th or 12th OFDM symbols of the subframes #0 and #5, and sending the PSS in 2nd OFDM symbols of the subframes #1 and #6; or
the base station side sending the PSS in 1st or 5th or 8th or 12th OFDM symbols of the subframes #0 and #5, and sending the SSS in 2nd OFDM symbols of the subframes #1 and #6.

4. The method according to claim 1, wherein, the step of a base station side sending PSS and SSS in OFDM symbols which are not occupied by DMRS in subframes #0 and #5 comprises:
the base station side sending the PSS in 1st OFDM symbols of the subframes #0 and #5, and sending the SSS in 2nd or 3rd or 5th or 8th or 9th or 12th OFDM symbols of the subframes #0 and #5; or
the base station side sending the SSS in 1st OFDM symbols of the subframes #0 and #5, and sending the PSS in 2nd or 3rd or 5th or 8th or 9th or 12th OFDM symbols of the subframes #0 and #5; or
the base station side sending the PSS in 2nd OFDM symbols of the subframes #0 and #5, and sending the SSS in 3rd or 5th or 8th or 9th or 12th OFDM symbols of the subframes #0 and #5; or
the base station side sending the SSS in 2nd OFDM symbols of the subframes #0 and #5, and sending the PSS in 3rd or 5th or 8th or 9th or 12th OFDM symbols of the subframes #0 and #5; or
the base station side sending the PSS in 3rd OFDM symbols of the subframes #0 and #5, and sending the SSS in 5th or 8th or 9th or 12th OFDM symbols of the subframes #0 and #5; or
the base station side sending the SSS in 3rd OFDM symbols of the subframes #0 and #5, and sending the PSS in 5th or 8th or 9th or 12th OFDM symbols of the subframes #0 and #5; or the base station side sending the PSS in 5th OFDM symbols of the subframes #0 and #5, and sending the SSS in 8th or 9th or 12th OFDM symbols of the subframes #0 and #5; or the base station side sending the SSS in 5th OFDM symbols of the subframes #0 and #5, and sending the PSS in 8th or 9th or 12th OFDM symbols of the subframes #0 and #5; or the base station side sending the PSS in 8th OFDM symbols of the subframes #0 and #5, and sending the SSS in 9th or 12th OFDM symbols of the subframes #0 and #5; or the base station side sending the SSS in 8th OFDM symbols of the subframes #0 and #5, and sending the PSS in 9th or 12th OFDM symbols of the subframes #0 and #5; or the base station side sending the PSS in 9th OFDM symbols of the subframes #0 and #5, and sending the SSS in 12th OFDM symbols of the subframes #0 and #5; or the base station side sending the SSS in 9th OFDM symbols of the subframes #0 and #5, and sending the PSS in 12th OFDM symbols of the subframes #0 and #5.

5. The method according to claim 2, wherein, the method is applicable to a process of sending a normal cyclic prefix.

6. The method according to claim 1, wherein, the step of a base station side sending PSS and SSS in OFDM symbols which are not occupied by DMRS in subframes #1, #6, #0 and #5 comprises:

the base station side sending the PSS in 3rd OFDM symbols of the subframes #0 and #5, and sending the SSS in 1st OFDM symbols of the subframes #1 and #6; or the base station side sending the SSS in 3rd OFDM symbols of the subframes #0 and #5, and sending the PSS in 1st OFDM symbols of the subframes #1 and #6; or the base station side sending the SSS in 1st or 4th or 7th or 10th OFDM symbols of the subframes #0 and #5, and sending the PSS in 1st OFDM symbols of the subframes #1 and #6; or the base station side sending the PSS in 1st or 4th or 7th or 10th OFDM symbols of the subframes #0 and #5, and sending the SSS in 1st OFDM symbols of the subframes #1 and #6; or the base station side sending the SSS in 1st or 4th or 7th or 10th OFDM symbols of the subframes #0 and #5, and sending the PSS in 2nd OFDM symbols of the subframes #1 and #6; or the base station side sending the PSS in 1st or 4th or 7th or 10th OFDM symbols of the subframes #0 and #5, and sending the SSS in 2nd OFDM symbols of the subframes #1 and #6.

7. The method according to claim 1, wherein, the step of a base station side sending PSS and SSS in OFDM symbols which are not occupied by DMRS in subframes #0 and #5 comprises:

the base station side sending the PSS in 1st OFDM symbols of the subframes #0 and #5, and sending the SSS in 2nd or 3rd or th or 7th or 10th OFDM symbols of the subframes #0 and #5; or the base station side sending the SSS in 1st OFDM symbols of the subframes #0 and #5, and sending the PSS in 2nd or 3rd or 4th or 7th or 10th OFDM symbols of the subframes #0 and #5; or the base station side sending the PSS in 2nd OFDM symbols of the subframes #0 and #5, and sending the SSS in 3rd or 4th or 7th or 10th OFDM symbols of the subframes #0 and #5; or the base station side sending the SSS in 2nd OFDM symbols of the subframes #0 and #5, and sending the PSS in 3rd or 4th or 7th or 10th OFDM symbols of the subframes #0 and #5; or the base station side sending the PSS in 3rd OFDM symbols of the subframes #0 and #5, and sending the SSS in 4th or 7th or 10th OFDM symbols of the subframes #0 and #5; or the base station side sending the SSS in 3rd OFDM symbols of the subframes #0 and #5, and sending the PSS in 4th or 7th or 10th OFDM symbols of the subframes #0 and #5; or the base station side sending the PSS in 4th OFDM symbols of the subframes #0 and #5, and sending the SSS in 7th or 10th OFDM symbols of the subframes #0 and #5; or the base station side sending the SSS in 4th OFDM symbols of the subframes #0 and #5, and sending the PSS in 7th or 10th OFDM symbols of the subframes #0 and #5; or the base station side sending the PSS in 7th OFDM symbols of the subframes #0 and #5, and sending the SSS in 10th OFDM symbols of the subframes #0 and #5; or the base station side sending the SSS in 7th OFDM symbols of the subframes #0 and #5, and sending the PSS in 10th OFDM symbols of the subframes #0 and #5.

8. The method according to claim 1, wherein, the step of a base station side sending PSS and SSS in OFDM symbols which are not occupied by DMRS in subframes #1 and #6 comprises:

the base station side sending the SSS in 1st OFDM symbols of the subframes #1 and #6, and sending the PSS in 3rd OFDM symbols of the subframes #1 and #6; or the base station side sending the PSS in 1st OFDM symbols of the subframes #1 and #6, and sending the SSS in 3rd OFDM symbols of the subframes #1 and #6; or the base station side sending the PSS in 1st OFDM symbols of the subframes #1 and #6, and sending the SSS in 2nd OFDM symbols of the subframes #1 and #6; or the base station side sending the SSS in 1st OFDM symbols of the subframes #1 and #6, and sending the PSS in 2nd OFDM symbols of the subframes #1 and #6; or the base station side sending the PSS in 2nd OFDM symbols of the subframes #1 and #6, and sending the SSS in 3rd OFDM symbols of the subframes #1 and #6; or the base station side sending the SSS in 2nd OFDM symbols of the subframes #1 and #6, and sending the PSS in 3rd OFDM symbols of the subframes #1 and #6.

9. The method according to claim 6, wherein, the method is applicable to a process of sending an extended cyclic prefix.

10. The method according to claim 1, wherein, the method further comprises:

when the Cell-specific Reference Signals (CRS) of the port 0 used for synchronization tracking are not sent in the subframes #1 and #6, a base station sending the PSS or SSS through 1st OFDM symbols of the subframes #1 and #6;

when the CRS of the port 0 used for synchronization tracking are sent in the subframes #1and #6, the base station sending the PSS or SSS through the 1st OFDM symbols of the subframes #1 and #6, and the base station not sending the CRS of the port 0 used for synchronization tracking in the 1st OFDM symbols of the subframes #1 and #6, or not sending the CRS of the port 0 used for synchronization tracking only in conflicting resources in the 1st OFDM symbols of the subframes #1 and #6.

11. The method according to claim 1,
wherein the method further comprises: the base station side sending the PSS/SSS in OFDM symbols configured for reference signals used for Channel-State Information Reference Signals (CSI-RS) in subframes #0 and #5, and sending the PSS or SSS in one OFDM symbol of each of subframes #1 and #6:
after the step of the base station side sending the PSS or SSS in the OFDM symbols configured for the CSI-RS in the subframes #0 and #5, when the PSS or SSS conflict with the OFDM symbols configured for the CSI-RS, the base station not sending the CSI-RS in the OFDM symbols conflicting with the PSS or SSS, and still sending the CSI-RS in OFDM symbols not conflicting with the PSS or SSS in the same subframes #0 and #5, or a base station not sending the CSI-RS only in resources with conflict in the OFDM symbols and still sending the CSI-RS in resources without conflict in the OFDM symbols in the same subframes #0 and #5.

12. The method according to claim 11, wherein, the step of a base station side sending PSS or SSS in OFDM symbols configured for CSI-RS in subframes #0 and #5, and sending the PSS or SSS in one OFDM symbol of each of subframes #1 and #6 comprises:
the base station side sending the SSS in 8th or 9th or 10th or 11th OFDM symbols of the subframes #0 and #5, and sending the PSS in 3rd OFDM symbols of the subframes #1 and #6; or
the base station side sending the PSS in 8th or 9th or 10th or 11th OFDM symbols of the subframes #0 and #5, and sending the SSS in 3rd OFDM symbols of the subframes #1 and #6; or
the base station side sending the SSS in 8th or 9th or 10th or 11th OFDM symbols of the subframes #0 and #5, and sending the PSS in 2nd OFDM symbols of the subframes #1 and #6; or
the base station side sending the PSS in 8th or 9th or 10th or 11th OFDM symbols of the subframes #0 and #5, and sending the SSS in 2nd OFDM symbols of the subframes #1 and #6; or
the base station side sending the SSS in 8th or 9th or 10th or 11th OFDM symbols of the subframes #0 and #5, and sending the PSS in 1st OFDM symbols of the subframes #1 and #6; or
the base station side sending the PSS in 8th or 9th or 10th or 11th OFDM symbols of the subframes #0 and #5, and sending the SSS in 1st OFDM symbols of the subframes #1 and #6.

13. The method according to claim 12, wherein, the step of a base station side sending PSS or SSS in OFDM symbols configured for CSI-RS in subframes #0 and #5, and sending the PSS or SSS in one OFDM symbol of each of subframes #1 and #6 comprises:

when a short Cyclic Prefix (CP) is adopted, the base station side sending the PSS in 9th or 10th or 11th OFDM symbols of the subframes #0 and #5, and sending the SSS in 2nd OFDM symbols of the subframes #1 and #6; or when the short CP is adopted, the base station side sending the SSS in 9th or 10th or 11th OFDM symbols of the subframes #0 and #5, and sending the PSS in 2nd OFDM symbols of the subframes #1 and #6; or when the short CP is adopted, the base station side sending the PSS in 9th or 10th or 11th OFDM symbols of the subframes #0 and #5, and sending the SSS in 1st OFDM symbols of the subframes #1 and #6; or when the short CP is adopted, the base station side sending the SSS in 9th or 10th or 11th OFDM symbols of the subframes #0 and #5, and sending the PSS in 1st OFDM symbols of the subframes #1 and #6; or when a long CP is adopted, the base station side sending the PSS in 8th or 9th OFDM symbols of the subframes #0 and #5, and sending the SSS in 3rd OFDM symbols of the subframes #1 and #6; or when the long CP is adopted, the base station side sending the SSS in 8th or 9th OFDM symbols of the subframes #0 and #5, and sending the PSS in 3rd OFDM symbols of the subframes #1 and #6; or when the long CP is adopted, the base station side sending the PSS in 8th or 9th OFDM symbols of the subframes #0 and #5, and sending the SSS in 2nd OFDM symbols of the subframes #1 and #6; or when the long CP is adopted, the base station side sending the SSS in 8th or 9th OFDM symbols of the subframes #0 and #5, and sending the PSS in 2nd OFDM symbols of the subframes #1 and #6; or when the long CP is adopted, the base station side sending the PSS in 8th or 9th OFDM symbols of the subframes #0 and #5, and sending the SSS in 1st OFDM symbols of the subframes #1 and #6; or when the long CP is adopted, the base station side sending the SSS in 8th or 9th OFDM symbols of the subframes #0 and #5, and sending the PSS in 1st OFDM symbols of the subframes #1 and #6.

14. The method according to claim 11, wherein, the method further comprises:
when the CRS of the port 0 used for synchronization tracking are not sent in the subframes #1 and #6, a base station sending the PSS or SSS through 1st OFDM symbols of the subframes #1 and #6; and
when the CRS of the port 0 used for synchronization tracking are sent in the subframes #1and #6, the base station sending the PS S/SSS through the 1st OFDM symbols of the subframes #1 and #6, and the base station not sending the CRS of the port 0 used for synchronization tracking in the OFDM symbols, or not sending the CRS of the port 0 used for synchronization tracking only in conflicting resources in the OFDM symbols.

15. A base station, comprising: a first module and a second module, wherein,
the first module is configured to: with respect to a time domain, configure Orthogonal Frequency Division Multiplexing (OFDM) symbols which are not occupied by Demodulation Reference Signals (DMRS) in subframes #1 and #6, or subframes #0 and #5, or subframes #1, #6, #0 and #5 as OFDM symbols for transmitting Primary Synchronization Signals (PSS) and Secondary Synchronization Signals (SSS), and with respect to a frequency domain, configure resources of intermediate 6 Physical Resource Block (PRB) pairs of system bandwidth as resources for transmitting the PSS or SSS; and the second module is configured to: send the PSS/SSS in the OFDM symbols which are not occupied by the DMRS and the resources configured by the first module, and still send the DMRS in OFDM symbols which are occupied by the DMRS in the same subframes #1 and #6, or subframes #0 and #5, or subframes #1, #6, #0 and #5;

wherein the base station side sends the PSS/SSS in OFDM symbols configured for reference signals used for synchronization tracking including Cell-specific Reference Signals (CRS) through a port 0 with a period thereof being 5 ms:

when the reference signals used for synchronization tracking are not sent in subframes #1 and #6, or subframes #0 and #5, or subframes #1, #6, #0 and #5, the base station sending the PSS/SSS through the OFDM symbols occupied by the reference signals used for synchronization tracking;

when the reference signals used for synchronization tracking are sent in subframes #1 and #6, or subframes #0 and #5, or subframes #1, #6, #0 and #5, the base station not sending the reference signals used for synchronization tracking only in conflicting resources in the OFDM symbols occupied by the reference signals used for synchronization tracking; wherein the conflicting resources refers to overlapping resources between the PSS/SSS and the reference signals used for synchronization tracking.

16. The base station according to claim 15, wherein, the second module is configured to: send the PSS in 2nd OFDM symbols of the subframes #1 and #6, and send the SSS in 1st OFDM symbols of the subframes #1 and #6; or send the SSS in 2nd OFDM symbols of the subframes #1 and #6, and send the PSS in 1st OFDM symbols of the subframes #1 and #6; or send the SSS in 9th OFDM symbols of the subframes #0 and #5, and send the PSS in 1st OFDM symbols of the subframes #1 and #6; or send the PSS in 9th OFDM symbols of the subframes #0 and #5, and send the SSS in 1st OFDM symbols of the subframes #1 and #6; or send the SSS in 9th OFDM symbols of the subframes #0 and #5, and send the PSS in 2nd OFDM symbols of the subframes #1 and #6; or send the PSS in 9th OFDM symbols of the subframes #0 and #5, and send the SSS in 2nd OFDM symbols of the subframes #1 and #6; or send the SSS in 1st or 5th or 8th or 12th OFDM symbols of the subframes #0 and #5, and send the PSS in 1st OFDM symbols of the subframes #1 and #6; or send the PSS in 1st or 5th or 8th or 12th OFDM symbols of the subframes #0 and #5, and send the SSS in 1st OFDM symbols of the subframes #1 and #6; or send the SSS in 1st or 5th or 8th or 12th OFDM symbols of the subframes #0 and #5, and send the PSS in 2nd OFDM symbols of the subframes #1 and #6; or send the PSS in 1st or 5th or 8th or 12th OFDM symbols of the subframes #0 and #5, and send the SSS in 2nd OFDM symbols of the subframes #1 and #6; or send the PSS in 1st OFDM symbols of the subframes #0 and #5, and send the SSS in 2nd or 3rd or 5th or 8th or 9th or 12th OFDM symbols of the subframes #0 and #5; or send the SSS in 1st OFDM symbols of the subframes #0 and #5, and send the PSS in 2nd or 3rd or 5th or 8th or 9th or 12th OFDM symbols of the subframes #0 and #5; or send the PSS in 2nd OFDM symbols of the subframes #0 and #5, and send the SSS in 3rd or 5th or 8th or 9th or 12th OFDM symbols of the subframes #0 and #5; or send the SSS in 2nd OFDM symbols of the subframes #0 and #5, and send the PSS in 3rd or 5th or 8th or 9th or 12th OFDM symbols of the subframes #0 and #5; or send the PSS in 3rd OFDM symbols of the subframes #0 and #5, and send the SSS in 5th or 8th or 9th or 12th OFDM symbols of the subframes #0 and #5; or send the SSS in 3rd OFDM symbols of the subframes #0 and #5, and send the PSS in 5th or 8th or 9th or 12th OFDM symbols of the subframes #0 and #5; or send the PSS in 5th OFDM symbols of the subframes #0 and #5, and send the SSS in 8th or 9th or 12th OFDM symbols of the subframes #0 and #5; or send the SSS in 5th OFDM symbols of the subframes #0 and #5, and send the PSS in 8th or 9th or 12th OFDM symbols of the subframes #0 and #5; or send the PSS in 8th OFDM symbols of the subframes #0 and #5, and send the SSS in 9th or 12th OFDM symbols of the subframes #0 and #5; or send the SSS in 8th OFDM symbols of the subframes #0 and #5, and send the PSS in 9th or 12th OFDM symbols of the subframes #0 and #5; or send the PSS in 9th OFDM symbols of the subframes #0 and #5, and send the SSS in 12th OFDM symbols of the subframes #0 and #5; or send the SSS in 9th OFDM symbols of the subframes #0 and #5, and send the PSS in 12th OFDM symbols of the subframes #0 and #5.

17. The base station according to claim 15, wherein, the second module is configured to: send the PSS in 3rd OFDM symbols of the subframes #0 and #5, and send the SSS in 1st OFDM symbols of the subframes #1 and #6; or send the SSS in 3rd OFDM symbols of the subframes #0 and #5, and send the PSS in 1st OFDM symbols of the subframes #1 and #6; or send the SSS in 1st or 4th or 7th or 10th OFDM symbols of the subframes #0 and #5, and send the PSS in 1st OFDM symbols of the subframes #1 and #6; or send the PSS in 1st or 4th or 7th or 10th OFDM symbols of the subframes #0 and #5, and send the SSS in 1st OFDM symbols of the subframes #1 and #6; or send the SSS in 1st or 4th or 7th or 10th OFDM symbols of the subframes #0 and #5, and send the PSS in 2nd OFDM symbols of the subframes #1 and #6; or send the PSS in 1st or 4th or 7th or 10th OFDM symbols of the subframes #0 and #5, and send the SSS in 2nd OFDM symbols of the subframes #1 and #6; or send the PSS in 1st OFDM symbols of the subframes #0 and #5, and send the SSS in 2nd or 3rd or 4th or 7th or 10th OFDM symbols of the subframes #0 and #5; or send the SSS in 1st OFDM symbols of the subframes #0 and #5, and send the PSS in 2nd or 3rd or 4th or 7th or 10th OFDM symbols of the subframes #0 and #5; or send the PSS in 2nd OFDM symbols of the subframes #0 and #5, and send the SSS in 3rd or 4th or 7th or 10th OFDM symbols of the subframes #0 and #5; or send the SSS in 2nd OFDM symbols of the subframes #0 and #5, and send the PSS in 3rd or 4th or 7th or 10th OFDM symbols of the subframes #0 and #5; or send the PSS in 3rd OFDM symbols of the subframes #0 and #5, and send the SSS in 4th or 7th or 10th OFDM symbols of the subframes #0 and #5; or send the SSS in 3rd OFDM symbols of the subframes #0 and #5, and send the PSS in 4th or 7th or 10th OFDM symbols of the subframes #0 and #5; or send the PSS in 4th OFDM symbols of the subframes #0 and #5, and send the SSS in 7th or 10th OFDM symbols of the subframes #0 and #5; or send the SSS in 4th OFDM symbols of the subframes #0 and #5, and send the PSS in 7th or 10th OFDM symbols of the subframes #0 and #5; or send the PSS in 7th OFDM symbols of the subframes #0 and #5, and send the SSS in 10th OFDM symbols of the subframes #0 and #5; or send the SSS in 7th OFDM symbols of the subframes #0 and #5, and send the PSS in 10th OFDM symbols of the subframes #0 and #5; or send the SSS in 1st OFDM symbols of the subframes #1 and #6, and send the PSS in 3rd OFDM symbols of the subframes #1 and #6; or send the PSS in 1st OFDM symbols of the subframes #1 and #6, and send the SSS in 3rd OFDM symbols of the subframes #1 and #6; or send the PSS in 1st OFDM symbols of the subframes #1 and #6, and send the SSS in 2nd OFDM symbols of the subframes #1 and #6; or send the SSS in 1st OFDM symbols of the subframes #1 and #6, and send the PSS in 2nd OFDM symbols of the subframes #1 and #6; or send the PSS in 2nd OFDM symbols of the subframes #1 and #6, and send the SSS in 3rd OFDM symbols of the subframes #1 and #6; or send the SSS in 2nd OFDM symbols of the subframes #1 and #6, and send the PSS in 3rd OFDM symbols of the subframes #1 and #6; or send the SSS in 8th or 9th or 10th or 11th OFDM symbols of the subframes #0 and #5, and send the PSS in 3rd OFDM symbols of the subframes #1 and #6; or send the PSS in 8th or 9th or 10th or 11th OFDM symbols of the subframes #0 and #5, and send the SSS in 3rd OFDM symbols of the subframes #1 and #6; or send the SSS in 8th or 9th or 10th or 11th OFDM symbols of the subframes #0 and #5, and send the PSS in 2nd OFDM symbols of the subframes #1 and #6; or send the PSS in 8th or 9th or 10th or 11th OFDM symbols of the subframes #0 and #5, and send the SSS in 2nd OFDM symbols of the subframes #1 and #6; or send the SSS in 8th or 9th or 10th or 11th OFDM symbols of the subframes #0 and #5, and send the PSS in 1st OFDM symbols of the subframes #1 and #6; or send the PSS in 8th or 9th or 10th or 11th OFDM symbols of the subframes #0 and #5, and send the SSS in 1st OFDM symbols of the subframes #1 and #6.

18. The base station according to claim 15, wherein, when a short Cyclic Prefix (CP) is adopted, the second module is configured to: send the PSS in 9th or 10th or 11th OFDM symbols of the subframes #0 and #5, and send the SSS in 2nd OFDM symbols of the subframes #1 and #6; or send the SSS in 9th or 10th or 11th OFDM symbols of the subframes #0 and #5, and send the PSS in 2nd OFDM symbols of the subframes #1 and #6; or send the PSS in 9th or 10th or 11th OFDM symbols of the subframes #0 and #5, and send the SSS in 1st OFDM symbols of the subframes #1 and #6; or send the SSS in 9th or 10th or 11th OFDM symbols of the subframes #0 and #5, and send the PSS in 1st OFDM symbols of the subframes #1 and #6;

when a long CP is adopted, the second module is configured to: send the PSS in 8th or 9th OFDM symbols of the subframes #0 and #5, and send the SSS in 3rd OFDM symbols of the subframes #1 and #6; or send the SSS in 8th or 9th OFDM symbols of the subframes #0 and #5, and send the PSS in 3rd OFDM symbols of the subframes #1 and #6; or send the PSS in 8th or 9th OFDM symbols of the subframes #0 and #5, and send the SSS in 2nd OFDM symbols of the subframes #1 and #6; or send the SSS in 8th or 9th OFDM symbols of the subframes #0 and #5, and send the PSS in 2nd OFDM symbols of the subframes #1 and #6; or send the PSS in 8th or 9th OFDM symbols of the subframes #0 and #5, and send the SSS in 1st OFDM symbols of the subframes #1 and #6; or send the SSS in 8th or 9th OFDM symbols of the subframes #0 and #5, and send the PSS in 1st OFDM symbols of the subframes #1 and #6.

19. The base station according to claim 15, wherein,
the second module is further configured to: when the first module configures to send the DMRS and the PSS/SSS in the resources of the intermediate 6 PRB pairs of the system bandwidth, if the DMRS and the PSS/SSS appear within the same OFDM symbol, only send the PSS/SSS in conflicting OFDM symbols and not send the DMRS, or only send the PSS/SSS in the conflicting OFDM symbols and not send the DMRS only in resources with conflict in the conflicting OFDM symbols;

or the second module is further configured to: in the resources of the intermediate 6 PRB pairs of the system bandwidth, schedule and send user equipment data in a unit of slot within a slot in which a PRB without conflict is located, not schedule and not send the user equipment data in a slot in which a PRB with conflict is located, and only send the PSS/SSS in the PRB with conflict, and not send the DMRS;

wherein, the conflict is a conflict between the PSS/SSS and the DMRS occurring in the intermediate 6 PRB pairs.

* * * * *